United States Patent
Lee et al.

(12)

(10) Patent No.: US 11,184,538 B2
(45) Date of Patent: Nov. 23, 2021

(54) ELECTRONIC DEVICE FOR SELECTIVELY GENERATING VIDEO BY USING IMAGE DATA ACQUIRED AT FRAME RATE CHANGED ACCORDING TO DISTANCE BETWEEN SUBJECT AND REFERENCE REGION, AND OPERATION METHOD THEREFOR

(71) Applicant: SAMSUNG ELECTRONICS CO., LTD., Gyeonggi-do (KR)

(72) Inventors: Changwoo Lee, Gyeonggi-do (KR); Dohan Kim, Gyeonggi-do (KR); Kwanho Kim, Gyeonggi-do (KR); Jaeho Kim, Gyeonggi-do (KR); Jinmin Bang, Gyeonggi-do (KR); Hajoong Park, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/969,309

(22) PCT Filed: Feb. 11, 2019

(86) PCT No.: PCT/KR2019/001632
§ 371 (c)(1),
(2) Date: Aug. 12, 2020

(87) PCT Pub. No.: WO2019/160288
PCT Pub. Date: Aug. 22, 2019

(65) Prior Publication Data
US 2021/0051269 A1    Feb. 18, 2021

(30) Foreign Application Priority Data
Feb. 14, 2018   (KR) .......................... 10-2018-0018698

(51) Int. Cl.
  *H04N 5/232*    (2006.01)
  *H04N 5/77*     (2006.01)
  *H04N 5/907*    (2006.01)

(52) U.S. Cl.
  CPC ..... *H04N 5/23245* (2013.01); *H04N 5/23229* (2013.01); *H04N 5/77* (2013.01); *H04N 5/907* (2013.01)

(58) Field of Classification Search
  CPC .. H04N 5/23245; H04N 5/23229; H04N 5/77; H04N 5/907; H04N 9/8042;
  (Continued)

(56) References Cited

U.S. PATENT DOCUMENTS 8,305,477 B2 * 11/2012 Yamana ........... H04N 5/232945
                                                      348/333.02
9,143,671 B2    9/2015 Nonaka
(Continued)

FOREIGN PATENT DOCUMENTS

JP    2017163510    9/2017

OTHER PUBLICATIONS

PCT/ISA/210 Search Report issued on PCT/KR2019/001632, dated May 10, 2019, pp. 5.
PCT/ISA/237 Written Opinion issued on PCT/KR2019/001632, dated May 10, 2019, pp. 5.

*Primary Examiner* — Hung H Lam
(74) *Attorney, Agent, or Firm* — The Farrell Law Firm, P.C.

(57) ABSTRACT

Disclosed is an electronic device for selectively generating video using image data acquired at a frame rate changed according to the distance between a subject and a reference region; and an operation method. The electronic device includes a camera, memory, display and processor, which may be configured to acquire, at a first frame rate, a plurality of first images including an object of interest, identify the (Continued)

distance between a reference region, by using at least some first images of the plurality of first images; obtain, at a second frame rate higher than the first frame rate, a plurality of second images including the object of interest, based on the distance satisfying a first designated condition; identify whether the position of the object of interest at least temporarily belongs to the reference region, and generate video corresponding to the second frame rate for the object of interest.

15 Claims, 19 Drawing Sheets

(58) Field of Classification Search
CPC .. H04N 5/772; H04N 5/783; H04N 5/232945; H04N 5/23216; H04N 5/232933; H04N 5/232; H04N 5/23254; H04N 5/23218; H04N 21/4402
See application file for complete search history.

(56) References Cited

U.S. PATENT DOCUMENTS

| | | | |
|---|---|---|---|
| 9,538,153 B1 | 1/2017 | Kosakai et al. | |
| 9,866,788 B2* | 1/2018 | Landy | H04N 7/0117 |
| 2007/0195182 A1* | 8/2007 | Ito | H04N 5/23245 |
| | | | 348/308 |
| 2007/0279512 A1* | 12/2007 | Maruyama | H04N 5/2624 |
| | | | 348/333.11 |
| 2012/0113307 A1* | 5/2012 | Watanabe | H04N 5/2621 |
| | | | 348/333.01 |
| 2014/0132758 A1* | 5/2014 | Saptharishi | G06T 7/90 |
| | | | 348/135 |
| 2015/0256749 A1* | 9/2015 | Frey | H04N 5/77 |
| | | | 348/220.1 |
| 2016/0182866 A1 | 6/2016 | Landqvist et al. | |
| 2018/0017659 A1 | 1/2018 | Irie | |

* cited by examiner

ELECTRONIC DEVICE FOR SELECTIVELY GENERATING VIDEO BY USING IMAGE DATA ACQUIRED AT FRAME RATE CHANGED ACCORDING TO DISTANCE BETWEEN SUBJECT AND REFERENCE REGION, AND OPERATION METHOD THEREFOR

CROSS-REFERENCE TO RELATED APPLICATION(S)

This application is a National Phase Entry of PCT International Application No. PCT/KR2019/001632, which was filed on Feb. 11, 2019 and claims priority to Korean Patent Application No. 10-2018-0018698, which was filed on Feb. 14, 2018 in the Korean Intellectual Property Office, the contents of each of which are incorporated herein by reference.

BACKGROUND

1. Field

Various embodiments disclosed in the present document relate to an electronic device to selectively generate video by using image data which is obtained at a frame rate which is changed according to a distance between a subject and a reference area.

2. Description of the Related Art

With high integration of performance of a portable electronic device such as a smartphone, etc., services and additional functions provided through an electronic device have been diversified. Communication service providers or electronic device manufacturers have exerted much effort on mounting various components on an electronic device and developing related techniques to raise effective value of an electronic device and satisfy demands of various users.

Recently, an electronic device has mounted thereon a high-performance camera capable of obtaining various images. A user may capture itself or a background, by using the camera mounted on an electronic device. A camera module provided on the electronic device may generally include a lens for collecting light, a photodiode for converting the collected light into an analog electric signal, and an analog-to-digital converter (ADC) for converting the analog electric signal into a digital electric signal that is image data.

Meanwhile, a process of converting an electric signal from a photodiode into image data and outputting the image data may be referred to as a read-out operation, and a read-out speed of an image sensor may be generally lower than or equal to an output speed of an interface that connects the image sensor with an external electronic device (e.g., an application processor).

High-speed capturing may mean a scheme of increasing the number of image frames obtained per second by increasing a read-out speed of an image sensor. Accordingly, if the high-speed capturing is performed, an electronic device may obtain a large amount of image frames in a short time. However, a considerable amount of memory is required to store the obtained large amount of image frames, but it may be difficult for a portable electronic device to be provided with a memory of a predetermined size or more.

SUMMARY

If a large amount of image frames are obtained through an image sensor as high-speed capturing is performed, a process of selecting image frames to be actually stored in a memory among the obtained image frames may be required. For example, even though the high-speed capturing is started according to a pre-designated condition (or a trigger) and the large amount of image frames are obtained, image frames required to produce a slow motion image may be only some of the obtained large amount of image frames.

An electronic device according to various embodiments disclosed in the present disclosure may store, in a memory, only an image frame which is determined to be required to generate video among image frames obtained through an image sensor by independently managing a time point at which a capturing operation of obtaining image frames through the image sensor is started and a time point at which a recording operation of storing the obtained image frames in the memory is started. For example, the electronic device according to various embodiments disclosed in the present disclosure may start high-speed capturing by increasing a read-out speed of the image sensor from a time point at which it is determined that a designated first condition is satisfied, and then, start high-speed recording by storing image frames obtained through the image sensor in the memory from a time point at which it is determined that a designated second condition is satisfied.

An electronic device according to various embodiments comprises a camera, a display, a memory, and a processor, wherein the processor may be configured to: obtain, at a first frame rate, a plurality of first images including an object of interest by using the camera, identify a distance between the object of interest and a reference area which is set based on an input, by using at least some first images of the plurality of first images, based on the distance satisfying a first designated condition, obtain, at a second frame rate higher than the first frame rate, a plurality of second images including the object of interest by using the camera, while obtaining the plurality of second images, identify whether a location of the object of interest at least temporarily belongs to the reference area, by using at least some second images of the plurality of second images, and based on the location at least temporarily belonging to the reference area, generate video which corresponds to the second frame rate for the object of interest by at least using the at least some second images which correspond to time during which the location of the object of interest belongs at least temporarily to the reference area among the plurality of second images.

A method for controlling an electronic device according to various embodiments comprises obtaining, at a first frame rate, a plurality of first images including an object of interest by using a camera of the electronic device, identifying a distance between the object of interest and a reference area which is set based on an input, by using at least some first images of the plurality of first images, based on the distance satisfying a first designated condition, obtaining, at a second frame rate higher than the first frame rate, a plurality of second images including the object of interest by using the camera, while obtaining the plurality of second images, identifying whether a location of the object of interest at least temporarily belongs to the reference area, by using at least some second images of the plurality of second images, and based on the location at least temporarily belonging to the reference area, generating video which corresponds to the second frame rate for the object of interest by at least using the at least some second images which correspond to time during which the location of the object of interest belongs at least temporarily to the reference area among the plurality of second images.

An electronic device according to various embodiments disclosed in the present disclosure may prevent image frames which are not required to generate video from being stored in a memory by independently managing a time point at which high-speed capturing is started and a time point at which high-speed recording is started. Accordingly, the electronic device may efficiently use the memory when performing the high-speed capturing.

An electronic device according to various embodiments disclosed in the present disclosure may substantially reduce a size of image frames by performing sampling on a large amount of image frames obtained in an image sensor or selectively deleting at least some of the image frames. Accordingly, a processor of the electronic device may process an editing operation, an encoding operation, or a decoding operation, etc. for the image frames in real time.

DETAILED DESCRIPTION

Hereinafter, various embodiments of the present document will be described with reference to the accompanying drawings.

Figure 1:
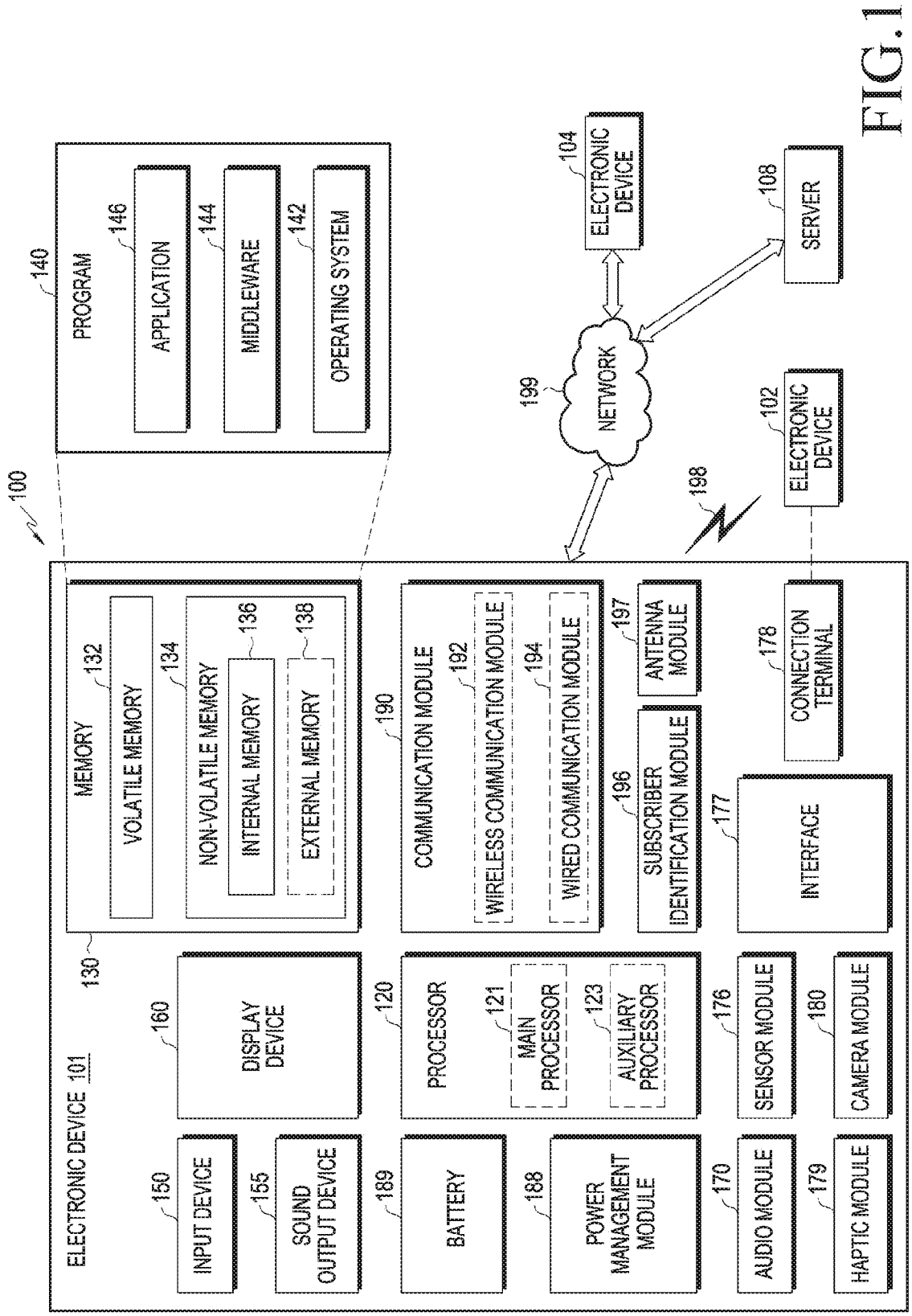
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GLASS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
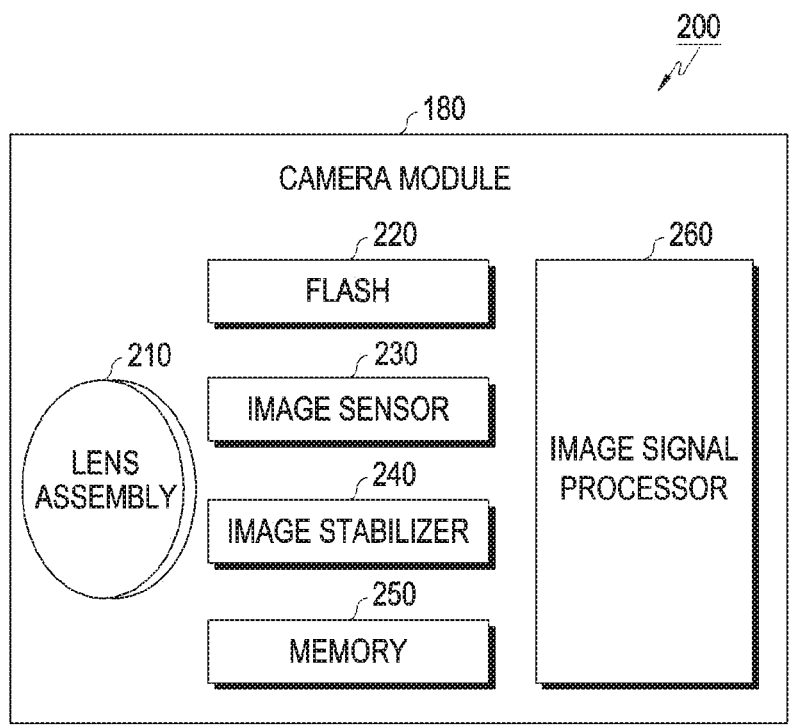
FIG. 2 is a block diagram illustrating a camera module according to various embodiments.

FIG. 2 is a block diagram 200 illustrating the camera module 180 according to various embodiments. Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, autofocusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer. The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

An electronic device according to various embodiments comprises a camera, a display, a memory, and a processor, wherein the processor may be configured to: obtain, at a first frame rate, a plurality of first images including an object of interest by using the camera, identify a distance between the object of interest and a reference area which is set based on an input, by using at least some first images of the plurality of first images, based on the distance satisfying a first designated condition, obtain, at a second frame rate higher than the first frame rate, a plurality of second images including the object of interest by using the camera, while obtaining the plurality of second images, identify whether a location of the object of interest at least temporarily belongs to the reference area, by using at least some second images of the plurality of second images, and based on the location at least temporarily belonging to the reference area, generate video which corresponds to the second frame rate for the object of interest by at least using the at least some second images which correspond to time during which the location of the object of interest belongs at least temporarily to the reference area among the plurality of second images.

In an electronic device according to various embodiments, the processor may be configured to: based on the location not belonging to the reference area, generate video which corresponds to the first frame rate for the object of interest by using at least some of the plurality of first images and the plurality of second images.

In an electronic device according to various embodiments, the processor may be configured to: as a part of obtaining the plurality of first images, obtain some of a plurality of lines which compose the plurality of first images as the at least some first images of the plurality of first images, and identify the distance between the reference area and the object of interest by using the some of the plurality of lines.

In an electronic device according to various embodiments, the processor may be configured to: store the obtained some of the plurality of lines in a buffer memory, and decompress the some of the plurality of lines stored in the buffer memory.

In an electronic device according to various embodiments, the processor may be configured to determine the at least some second images used for generating the video based on a speed at which the object of interest moves.

In an electronic device according to various embodiments disclosed in the present document, the processor may be configured to: divide the at least some second images which correspond to time during which the location of the object of interest belongs at least temporarily to the reference area into groups with a designated size in their obtained order and store the groups in the buffer memory.

In an electronic device according to various embodiments, the processor may be configured to release the set reference area based on a second input which corresponds to the input.

In an electronic device according to various embodiments, the processor may be further configured to set a second reference area which corresponds to a second input based on the second input.

In an electronic device according to various embodiments, the processor may be configured to adjust the distance according to the first designated condition based on a moving direction and a moving speed of the object of interest.

In an electronic device according to various embodiments, the processor may be configured to: after the distance is determined to satisfy the first designated condition, based on the location not being determined to belong to the reference area within designated time, adjust the second frame rate to the first frame rate.

Figure 3:
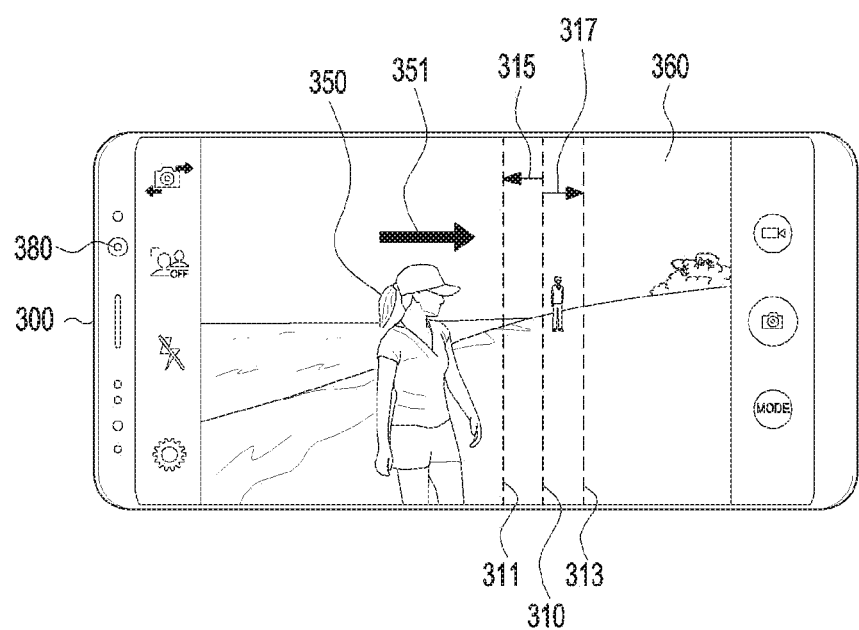
FIG. 3 is a diagram related to a method for setting a condition for starting high-speed capturing and high-speed recording in an electronic device according to various embodiments.

FIG. 3 is a diagram related to a method for setting a condition for starting high-speed capturing and high-speed recording in an electronic device according to various embodiments.

A subject which performs the method may be a processor in an electronic device 300 (e.g., an electronic device 101 in FIG. 1) including a display device 360 (e.g., a display device 160 in FIG. 1), a camera module 380 (e.g., a camera module 180 in FIG. 1), and the processor (e.g., a processor 120 in FIG. 1).

According to an embodiment, the electronic device 300 may perform high-speed capturing. Herein, the high-speed capturing may mean a fact that more image frames are obtained within short time by adjusting up a read-out speed of an image sensor (e.g., an image sensor 230 in FIG. 2) included in the camera module 380 of the electronic device 300 from a first frame rate (e.g., 30 fps) which is a frame rate of a display device to a second frame rate (e.g., 960 fps). For example, if the read-out speed of the image sensor is adjusted up from 30 fps to 960 fps, the electronic device 300 may obtain more image frames during the same time.

According to an embodiment, the electronic device 300 may perform high-speed recording. Herein, a recording speed may be defined as the number of image frames stored in a memory for a unit time (e.g., 1 second). For example, if the number of image frames stored in the memory for 30 seconds is 30, a recording speed may be defined as 30 fps. Therefore, the high-speed recording may mean a fact of adjusting up the number of image frames stored in the memory for the unit time. The electronic device 300 may perform high-speed recording by increasing the number of image frames stored in the memory when a read-out speed of the image sensor is adjusted up and the number of image frames obtained during unit time increases. For example, as the read-out speed of the image sensor is set to 960 fps which corresponds to a relatively high speed, when 960 image frames per second are obtained through the camera module 380, the electronic device 300 may perform recording according to 960 fps which is relatively a high speed by storing the obtained images in the memory at a speed of 960 frames per second. Meanwhile, even though 960 image frames per second are obtained through the camera module 380 as the read-out speed of the image sensor is set to 960 fps, the electronic device 300 may perform recoding according to 30 fps which is relatively a low speed by selectively storing only some of the obtained image frames in the memory of the electronic device 300. According to another embodiment, the electronic device may generate video by using image frames stored in the memory. If first image frames stored in the memory are according to recording performed according to 960 fps, the electronic device may generate video which corresponds to 960 fps by using the first image frames stored in the memory. If second image frames stored in the memory are according to recording performed according to 30 fps, the electronic device may generate video which corresponds to 30 fps by using the second image frames stored in the memory.

According to an embodiment, the electronic device 300 may capture an external object 350 through at least one camera module 380 and obtain an image including the external object 350. The electronic device 300 may display the obtained image through the display device 360, and identify a location (or a coordinate) of the external object 350 within the image displayed through the display device 360. Also, the electronic device 300 may identify movement of the external object 350 commonly included in a plurality of images by comparing the plurality of images obtained through the camera module 380. For example, the electronic device 300 may identify that the external object 350 moves in a first direction 351 by using the plurality of images obtained through the camera module 380.

According to an embodiment, as the external object 350 displayed on the display device 360 moves in the first direction 351, the electronic device 300 may determine whether the external object 350 displayed on the display device 360 is in contact with a first line 310 set on at least part of the display device 360. The electronic device may determine a moment when it is determined that the external object 350 displayed on the display device 360 is in contact with the first line 310 set on the at least part of the display device 360 as a time point for starting high-speed recording. According to another embodiment, as the external object 350 displayed on the display device 360 moves in the first direction 351, the electronic device 300 may determine whether a distance between the first line 310 set on the at least part of the display device 360 and the external object 350 satisfies a first condition. The electronic device may determine a moment when it is determined that the distance between the first line 310 set on the at least part of the display device 360 and the external object 350 satisfies the first condition as a time point for starting high-speed recording.

For example, after displaying least one image obtained through the camera module 380 on the display device 360 of the electronic device 300, the electronic device 300 may identify movement of the external object 350 displayed on the display device 360. Herein, the movement of the external object 350 displayed on the display device 360 may be caused by a fact that the electronic device 300 is fixed, but the external object 350 is actually moved, or a fact that the external object 350 is fixed, but the electronic device 300 is moved.

If it is determined that the external object 350 is not in contact with the first line 310, the electronic device 300 may perform normal recording for selecting only some of images which are obtained at the second frame rate (e.g., 960 fps) through the camera module 380 and storing only the some of the images in a memory (e.g., a memory 130 of FIG. 1) of the electronic device 300. For example, the electronic device 300 may store the some of the images obtained through the camera module 380 in the memory at the first frame rate (e.g., 30 fps) lower than the second frame rate.

If it is determined that the external object 350 is in contact with the first line 310, the electronic device 300 may perform high-speed recording for storing all of the images which are obtained at the second frame rate (e.g., 960 fps) through the camera module 380 in the memory of the electronic device 300. For example, the electronic device 300 may store the images obtained through the camera module 380 in the memory at the second frame rate (e.g., 960 fps).

Like this, after identifying the location of the external object 350, the electronic device 300 according to an embodiment may adjust a speed at which images obtained through the camera module 380 are stored in the memory of the electronic device, for example, a recording speed according to whether the external object 350 is in contact with the first line 310. Meanwhile, according to various embodiments, the first line 310 may be set based on a drag input or hovering input which is inputted on the display device 360 of the electronic device 300 or an input which is through an input device (e.g., an input device 150 in FIG. 1) of the electronic device 300. For example, the electronic device 300 may set the first line 310 in response to receiving the drag input on the display device 360, and use the first line 310 as a condition for starting high-speed recording.

According to an embodiment, in response to the first line 310 being set, the electronic device 300 may set a second line 311 at a location spaced apart by a first distance 315 to the left of the first line 310, and set a third line 313 at a position spaced apart by a second distance 317 to the right of the first line 310. Also, as the external object 350 displayed on the display device 360 moves in the first direction 351, the electronic device 300 may determine whether the external object 350 displayed on the display device 360 is in contact with the second line 311 or the third line 313. Further, the electronic device may determine a moment when it is determined that the external object 350 displayed on the display device 360 is in contact with the second line 311 or the third line 313 which is set on the display device 360 as a time point for starting high-speed capturing. According to another embodiment, as the external object 350 displayed on the display device 360 moves in the first direction 351, the electronic device 300 may determine whether a distance between the external object 350 and the second line 311 or the third line 313 which is set on at least part of the display device 360 satisfies a second condition. The electronic device may determine a moment when it is determined that the distance between the external object 350 and the second line 311 or the third line 313 which is set on the display device 360 satisfies the second condition as a time point for starting high-speed capturing.

For example, after displaying at least one image obtained through the camera module 380 on the display device 360 of the electronic device 300, the electronic device 300 may identify movement of the external object 350 displayed on the display device 360. Herein, the movement of the external object 350 displayed on the display device 360 may be caused by a fact that the electronic device 300 is fixed, but the external object 350 is actually moved, or a fact that the external object 350 is fixed, but the electronic device 300 is moved.

If it is determined that the external object 350 is not in contact with the second line 311 or the third line 313, the electronic device 300 may determine that high-speed capturing is not required, and then may set a read-out speed of the image sensor included in the camera module 380 as the first frame rate (e.g., 30 fps).

If it is determined that the external object 350 is in contact with the second line 311 or the third line 313, the electronic device 300 may determine that the high-speed capturing is required, and then may set the read-out speed of the image sensor included in the camera module 380 as the second frame rate (e.g., 960 fps). Meanwhile, using image frames obtained at the second frame rate (e.g., 960 fps), movement of the external object 350 may be precisely identified compared to using image frames obtained at the first frame rate (e.g., 30 fps), so the electronic device 300 may accurately detect a time point at which the external object 350 is in contact with the first line 310. For example, there is a need for precisely identifying the moment when the external object 350 is in contact with the first line 310 for starting high-speed recording from the moment when the external object 350 is in contact with the first line 310, and, for this, the electronic device 300 may start so called high-speed capturing for adjusting up a read-out speed of the image sensor from the first frame rate (e.g., 30 fps) to the second frame rate (e.g., 960 fps) from the moment when the external object 350 is in contact with the second line 311 or the third line 313 which is set before the first line 310.

Like this, after identifying the location of the external object 350, the electronic device 300 according to an embodiment may adjust a read-out speed of the image sensor included in the camera module 380 according to whether the external object 350 is in contact with the second line 311 or the third line 313. Meanwhile, according to various embodiments, the moving direction and the moving speed of the external object 350 may be considered in determining whether the external object 350 is in contact with the second line 311 or the third line 313. For example, as an example illustrated in FIG. 3, if it is determined that the external object 350 moves in the first direction 351, for example, the external object 350 moves in the first line 310 from the left of the first line 310, the electronic device 300 may start high-speed capturing from a moment when the external object 350 is in contact with the second line 311. Alternatively, if it is determined that the external object 350 moves in the first line 310 from the right of the first line 310, the electronic device 300 may start high-speed capturing from a moment when the external object 350 is in contact with the third line 313. According to another embodiment, the first distance 315 and the second distance 317 may be set equally or differently, and may be varied according to a moving speed or a moving direction of the external object 350 identified through the camera module 380. For example, if it is determined that the moving speed of the external object 350 is high, the electronic device 300 may adjust a time point at which high-speed capturing is started by setting the first distance 315 or the second distance 317 to a value greater than a reference value.

According to an embodiment, the electronic device 300 may identify the external object 350 based on an input received from a user of the electronic device 300. For example, when an image obtained through the camera module 380 is displayed through the display device 360, the electronic device 300 may receive at least one touch input through the display device 360. The electronic device 300 may set the external object 350 displayed at or around a location which corresponds to the at least one touch input received through the display device 360 as an object of interest (region of interest (ROI)). The electronic device 300 may identify the external object 350 which is set as the object of interest from a plurality of images obtained through the camera module 380, track a change in the location of the external object 350, and determine whether the external object 350 is in contact with the first line 310, the second line 311, or the third line 313.

Referring to FIG. 3, the first line 310 is illustrated as meaning a line, but embodiments of the present invention are not limited thereto. For example, the first line 310 may be interpreted to mean a first area having a designated size, and the first distance 315 or the second distance 317 may be interpreted to mean a distance from a point or a line set within the first area.

Figure 4:
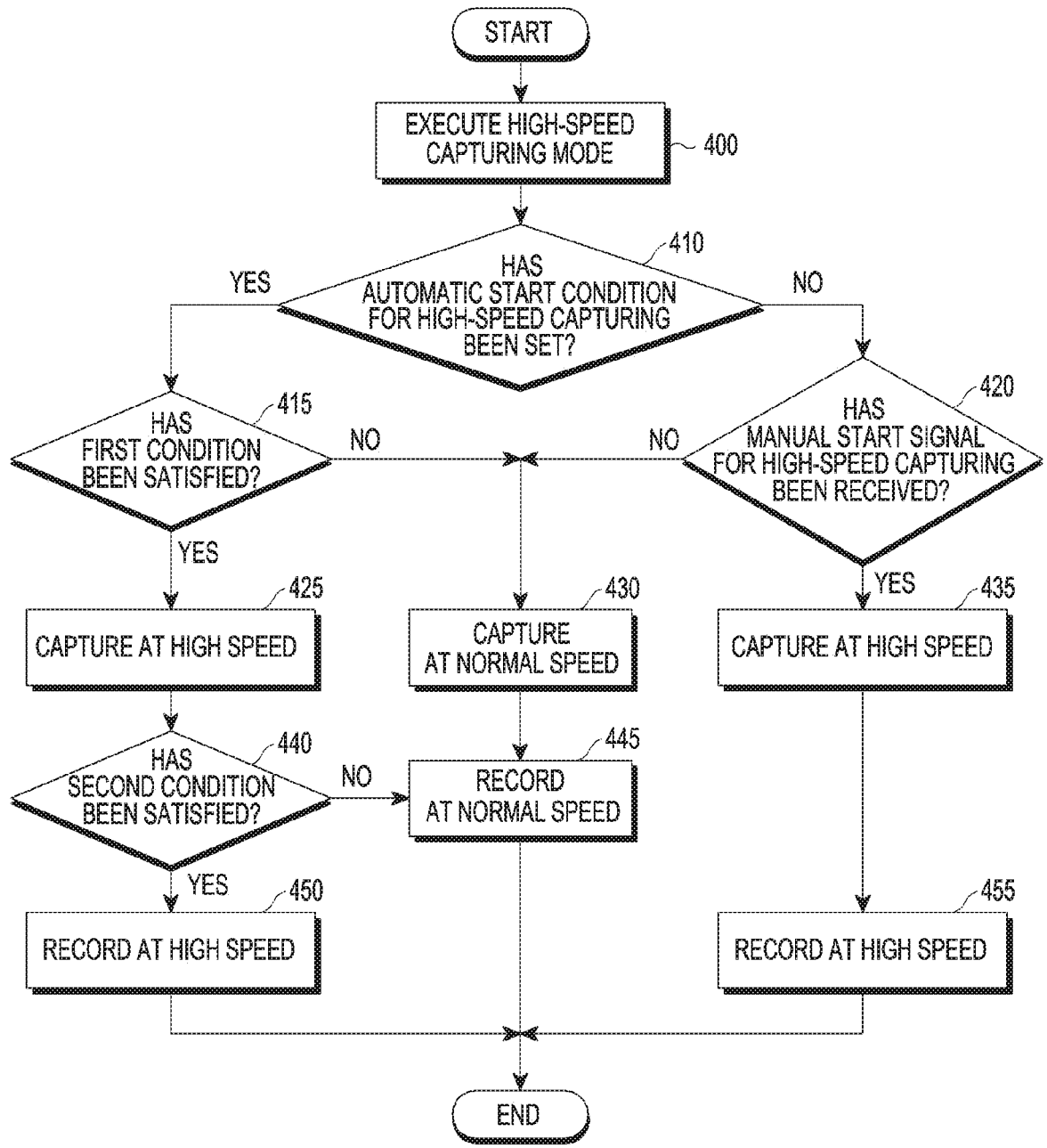
FIG. 4 is a flowchart for describing a process in which high-speed capturing and high-speed recording are performed according to various embodiments.

FIG. 4 is a flowchart for describing a process in which high-speed capturing and high-speed recording are performed according to various embodiments.

The process may be performed using a processor in an electronic device (e.g., an electronic device 101 in FIG. 1) including a display device (e.g., a display device 160 in FIG. 1), a camera module (e.g., a camera module 180 in FIG. 1), and the processor (e.g., a processor 120 in FIG. 1).

According to an embodiment, in operation 400, the processor may execute a high-speed capturing mode. For example, the processor may activate the camera module based on an input received from a user of the electronic device, and control the display device such that a user interface (e.g., a camera application) used to control the camera module may be displayed on the display device of the electronic device. Further, the processor may execute the high-speed capturing mode capable of obtaining at least one image at a high speed based on the input received from the user of the electronic device. If the high-speed capturing mode is executed according to an embodiment, the processor may determine whether an automatic start condition for high-speed capturing is satisfied in operation 410 or whether a manual start signal for high-speed capturing is received in operation 420.

Meanwhile, before the automatic start condition for the high-speed capturing is satisfied or before the manual start signal for the high-speed capturing is received, a read-out speed of an image sensor included in the camera module may be set to a first frame rate (e.g., 30 fps) which is a frame rate of the display device, and the processor may perform a normal capturing for obtaining image frames at the first frame rate. Further, the processor may provide a user with a preview image by displaying the image frames obtained at the first frame rate in real time on the display device of the electronic device. Also, the processor may perform normal recording for storing the obtained image frames in a memory of the electronic device at the first frame rate.

In operation 410, the processor may determine whether a condition related to automatic start for high-speed capturing is set. For example, if the condition related to the automatic start for the high-speed capturing is set after the high-speed capturing mode is executed, the processor may determine whether the set condition is satisfied and automatically start the high-speed capturing. Alternatively, if the condition related to the automatic start for the high-speed capturing is not set after the high-speed capturing mode is executed, the processor may determine whether a signal for manual start for the high-speed capturing is received.

According to an embodiment, the processor may determine that the condition related to the automatic start for the high-speed capturing is set if a first line (e.g., a first line 310 in FIG. 3) indicating a time point for starting high-speed recoding and a second line (e.g., a second line 311 in FIG. 3) or a third line (e.g., a third line 313 in FIG. 3) which indicates a time point for starting the high-speed capturing are set.

According to a determined result in operation 410, the processor may perform operation 415 if it is determined that the condition related to the automatic start for the high-speed capturing is set on the display device of the electronic device, and the processor may perform operation 420 if it is determined that the condition related to the automatic start for the high-speed capturing is not set.

In operation 415, the processor may determine whether the first condition is satisfied. Herein, whether the first condition is satisfied may be determined according to whether an external object which is displayed on the display device of the electronic device after being identified through the camera module of the electronic device is in contact with a second line (e.g., a second line 311 in FIG. 3) or a third line (e.g., a third line 313 in FIG. 3) which is set on the display device of the electronic device as a condition for starting high-speed capturing. For example, the processor may determine that the first condition is satisfied if the external object which is displayed on the display device of the electronic device after being identified through the camera module of the electronic device is in contact with the second line or the third line which is set on the display device of the electronic device as the condition (e.g., a time point) for starting the high-speed capturing.

If it is determined that the first condition is satisfied according to a determined result in operation 415, the processor may adjust up the read-out speed of the image sensor to start high-speed capturing in operation 425. For example, the processor may adjust the read-out speed of the image sensor from the first frame rate (e.g., 30 fps) to the second frame rate (e.g., 960 fps) which is a relatively high speed.

Alternatively, if it is determined that the first condition is not satisfied according to the determined result in operation 415, the processor may adjust down the read-out speed of the image sensor or maintain the first frame rate to continue capturing at a normal speed. For example, if the first condition is not satisfied within preset time after being determined that the condition related to the automatic start for the high-speed capturing is set, the processor may perform operation 430.

In operation 440, the processor may determine whether a second condition is satisfied. Herein, whether the second condition is satisfied may be determined according to whether the external object which is displayed on the display device of the electronic device after being identified through the camera module of the electronic device is in contact with a first line (e.g., a first line 310 in FIG. 3) which is set on the display device of the electronic device as a condition for starting high-speed recording. For example, if it is determined ('YES' in operation 415) that the external object which is displayed on the display device of the electronic device after being identified through the camera module of the electronic device is in contact with the second line or the third line which is set on the display device of the electronic device as the time point for starting the high-speed capturing, and then it is determined that the external object is also in contact with the first line, the processor may determine that the second condition is satisfied.

If it is determined that the second condition is satisfied according to a determined result in operation 440, the processor may start the high-speed recording in operation 450. For example, the processor may adjust up a speed at which image frames obtained through the camera module at the second frame rate (e.g., 960 fps) are stored in the memory from the first frame rate (e.g., 30 fps) to the second frame rate (e.g., 960 fps). Accordingly, all image frames obtained through the camera module from a moment when the second condition is satisfied may be stored in the memory of the electronic device.

Alternatively, if it is determined that the second condition is not satisfied according to the determined result in operation 440, the processor may perform recording at a normal speed in operation 445. For example, if the second condition is not satisfied within preset time after being determined that the first condition is satisfied in operation 415, the processor may perform operation 445.

According to an embodiment, if the signal for the manual start for the high-speed capturing is received in operation 420, the processor may start the high-speed capturing by adjusting up the read-out speed of the image sensor in operation 435. For example, the processor may adjust the read-out speed of the image sensor from the first frame rate (e.g., 30 fps) to the second frame rate (e.g., 960 fps) which is a relatively high speed. At the same time, the processor may start the high-speed recording in operation 455. For example, the processor may adjust up a speed at which image frames obtained through the camera module at the second frame rate (e.g., 960 fps) are stored in the memory from the first frame rate (e.g., 30 fps) to the second frame rate (e.g., 960 fps), and accordingly, all image frames obtained through the camera module may be stored in the memory of the electronic device.

Meanwhile, some of operations disclosed in FIG. 4 may be omitted or repeated multiple times. Further, it will be apparent that each of the operations disclosed in FIG. 4 is considered as an embodiment, and it will be noted that one operation may not be limitedly interpreted as being dependent on another operation.

Figure 5A:
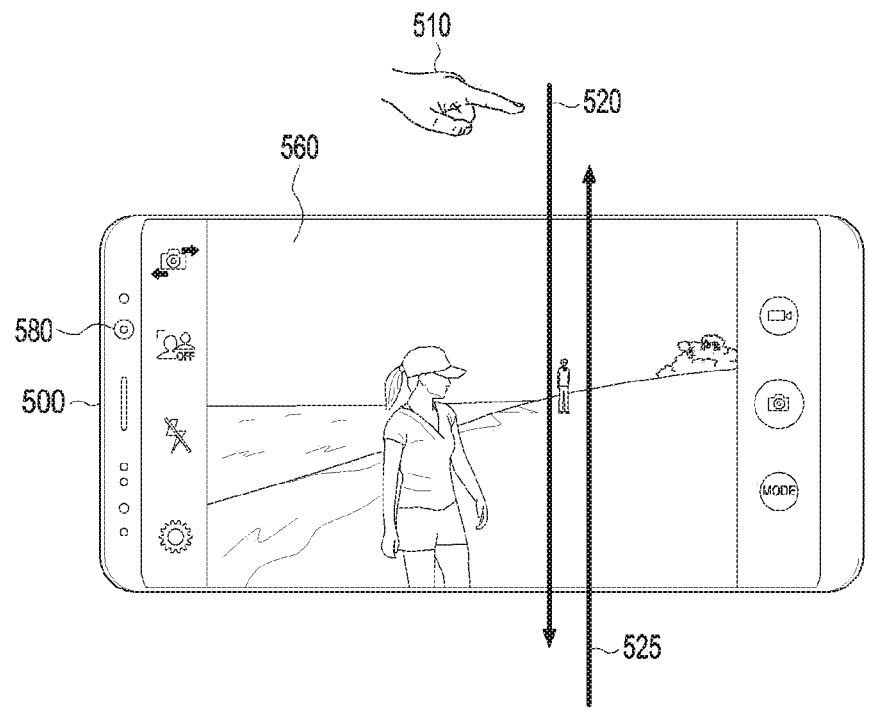
FIG. 5A is a diagram for describing a method for setting and releasing a time point for starting high-speed capturing and high-speed recording in an electronic device according to various embodiments.
Figure 5B:
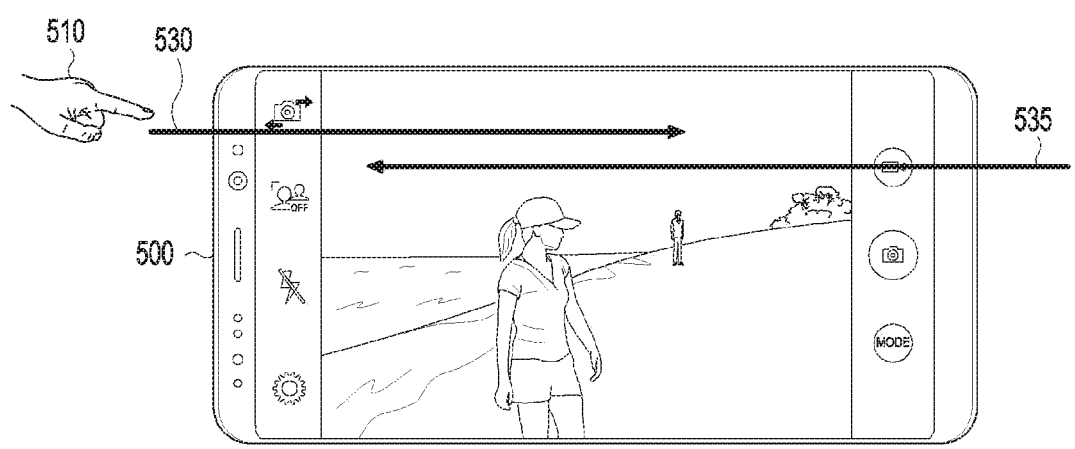
FIG. 5B is a diagram for describing a method for setting and releasing a time point for starting high-speed capturing and high-speed recording in an electronic device according to various embodiments.
Figure 5C:
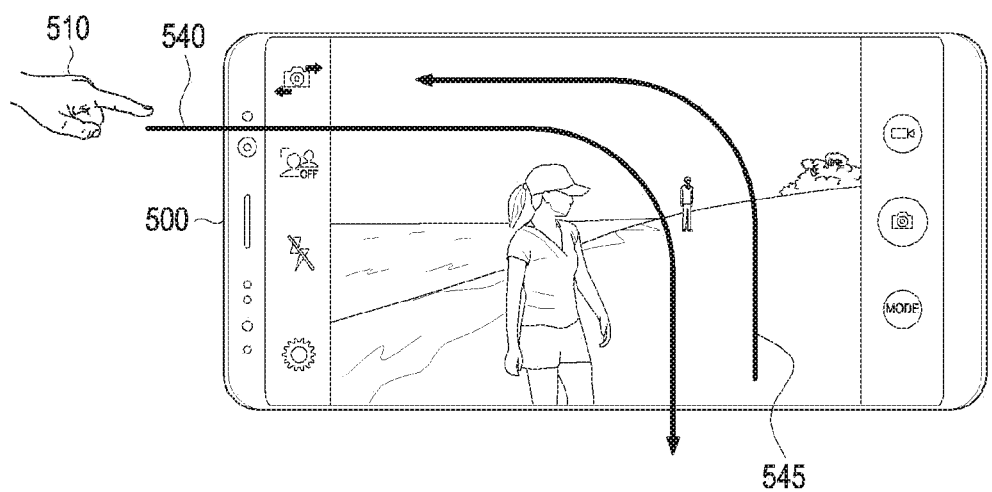
FIG. 5C is a diagram for describing a method for setting and releasing a time point for starting high-speed capturing and high-speed recording in an electronic device according to various embodiments.

FIG. 5A is a diagram for describing a method for setting and releasing a time point for starting high-speed capturing and high-speed recording in an electronic device according to various embodiments. FIG. 5B is a diagram for describing a method for setting and releasing a time point for starting high-speed capturing and high-speed recording in an electronic device according to various embodiments. FIG. 5C is a diagram for describing a method for setting and releasing a time point for starting high-speed capturing and high-speed recording in an electronic device according to various embodiments.

A subject which performs the method may be a processor in an electronic device 500 (e.g., an electronic device 101 in FIG. 1) including a display device 560 (e.g., a display device 160 in FIG. 1), a camera module 580 (e.g., a camera module 180 in FIG. 1), and the processor (e.g., a processor 120 in FIG. 1).

According to an embodiment, the processor may set at least one line or area which may be used as a condition for starting high-speed capturing or high-speed recording based on a drag input or hovering input which is inputted on the display device 560 of the electronic device 500 or an input which is through an input device (e.g., an input device 150 in FIG. 1) of the electronic device 500.

For example, the processor may activate the camera module 580 based on an input received from a user 510 of the electronic device 500, and control the display device 560 such that a user interface (e.g., a camera application) used to control the camera module 580 may be displayed on the display device 560 of the electronic device 500. Further, when the user interface used to control the camera module 580 is being displayed on the display device 560, the processor may identify drag inputs 520, 525, 530, 535, 540, and 545 inputted on the display device 560.

According to an embodiment, if a drag input with a straight form is received on the display device 560 when the user interface used to control the camera module 580 is being displayed on the display device 560, the processor may set or release a first line (e.g., a first line 310 in FIG. 3) according to a direction of the drag input. For example, referring to FIG. 5A, when the drag input is received in a first direction 520, the processor may set the first line (e.g., the first line 310 in FIG. 3) which may be used as a condition for starting high-speed capturing or high-speed recording at a location where the drag input is received. Further, if a drag input is received in a second direction 525 while the first line is set, the processor may release the set first line. Further, referring to FIG. 5B, if a drag input is received in a third direction 530, the processor may set a first line (e.g., a first line 310 in FIG. 3) which may be used as a condition for starting the high-speed capturing or the high-speed recording at a location where the drag input is received. Further, if a drag input is received in a fourth direction 535 while the first line is set, the processor may release the set first line.

According to an embodiment, if a drag input with a circular (or a curved) form is received on the display device 560 when the user interface used to control the camera module 580 is being displayed on the display device 560, the processor may set or release a first line according to a direction of the drag input. For example, referring to FIG. 5C, when the drag input is received in a fifth direction 540, the processor may set a first line (e.g., a first line 310 in FIG. 3) which may be used as a condition for starting the high-speed capturing or the high-speed recording at a location where the drag input is received. Further, if a drag input is received in a sixth direction 545 while the first line is set, the processor may release the set first line.

Meanwhile those skilled in the art will readily understand that the drag input with the straight form or the curved form is only some of various embodiments of the present invention, and a line or an area which may be used as a condition for starting high-speed capturing or high-speed recording may be set in various ways as well as embodiments described above.

Figure 6:
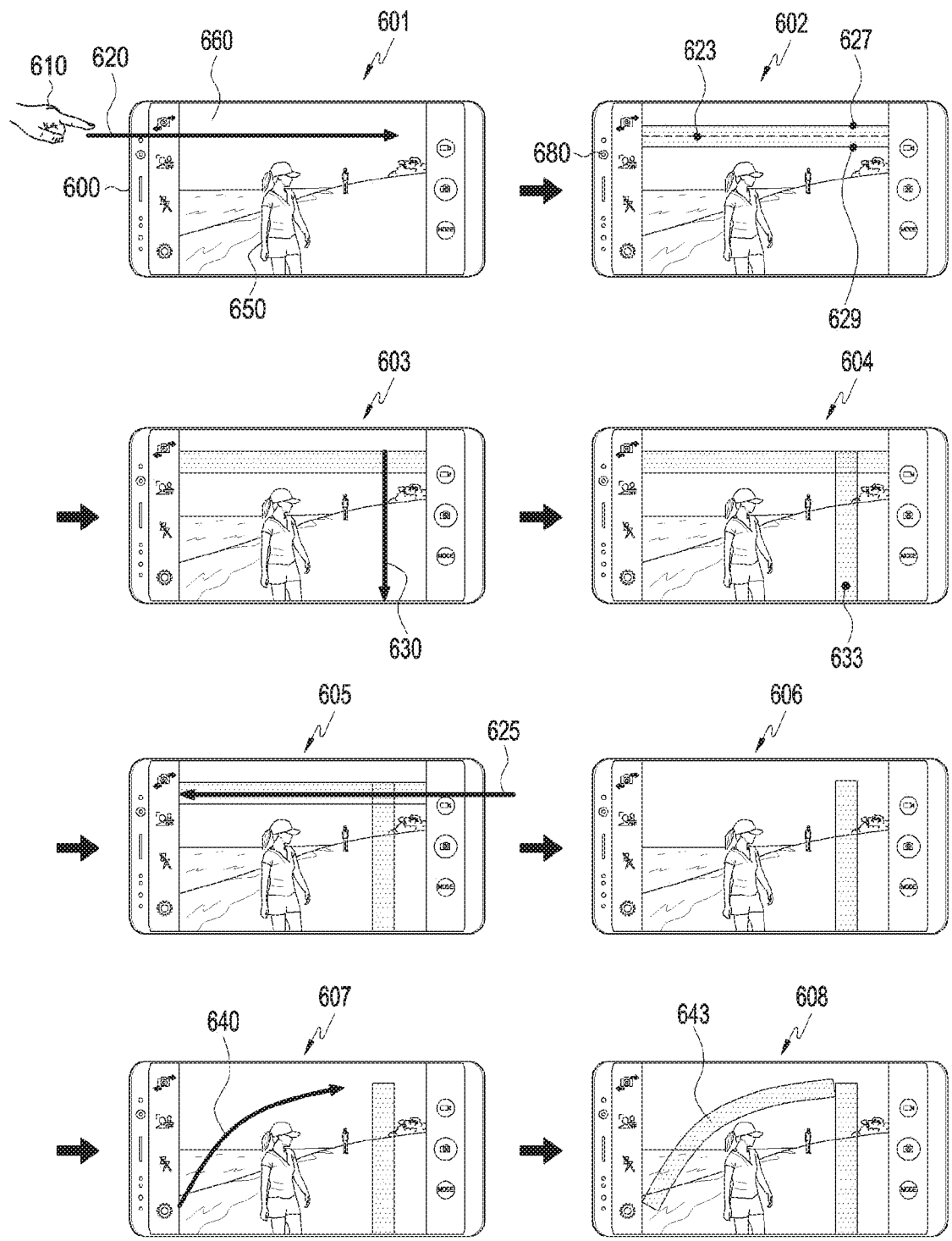
FIG. 6 is a diagram for describing a method for setting and releasing a plurality of time points for starting high-speed capturing and high-speed recording in an electronic device according to various embodiments.

FIG. 6 is a diagram for describing a method for setting and releasing a plurality of time points for starting high-speed capturing and high-speed recording in an electronic device according to various embodiments.

A subject which performs the method may be a processor in an electronic device 600 (e.g., an electronic device 101 in FIG. 1) including a display device 660 (e.g., a display device 160 in FIG. 1), a camera module 680 (e.g., a camera module 180 in FIG. 1), and the processor (e.g., a processor 120 in FIG. 1).

According to an embodiment, the processor may activate the camera module 680 based on an input received from a user 610 of the electronic device 600, and control the display device 660 such that a user interface (e.g., a camera application) used to control the camera module 680 may be displayed on the display device 660 of the electronic device 600. Further, when the user interface used to control the camera module 680 is being displayed on the display device 660, the processor may identify drag inputs 620, 625, 630, and 640 inputted on the display device 660.

According to an embodiment, in operation 601, the processor may identify a first drag input received in a first direction 620 through the display device 660. In operation 602, in response to the first drag input being identified, the processor may set at least one of a first line 623, a second line 627, and a third line 629 at a location which corresponds to the first drag input. At this time, a dotted line or a solid line may be displayed in an area including the set first line 623, second line 627, and third line 629 as described in operation 602. Alternatively, only a shaded area without a marker such as a dotted line or a solid line may be displayed in the area including the set first line 623, second line 627, and third line 629 as described in operation 603.

Meanwhile, the first line 623 may be used to determine a time point for starting high-speed recording. For example, if an external object 650 displayed on the display device 660 after being identified through the camera module 680 is in contact with the first line 623 which is set on the display device 660 as the condition for starting the high-speed recording, the processor may start the high-speed recording. Further, the second line 627 or the third line 629 may be used to determine a time point for starting high-speed capturing. For example, if the external object 650 displayed on the display device 660 after being identified through the camera module 680 is in contact with the second line 627 or the third line 629 which is set on the display device 660 as a condition for starting the high-speed capturing, the processor may start the high-speed capturing. According to an embodiment, the high-speed recording may be started as the external object 650 displayed on the display device 660 after being identified through the camera module 680 is in contact with the first line 623 at a second time point after the high-speed capturing is started as the external object 650 is in contact with the second line 627 at a first time point. The processor may precisely detect a moment when the external object 650 is in contact with the first line 623 by using image frames obtained from the first time point through the high-speed capturing. Further, the processor allows the high-speed recording to start from a second time point at which the external object 650 is in contact with the first line 623, thereby preventing that image frames which are unnecessary for generating slow motion video are excessively stored in a memory of the electronic device.

According to an embodiment, in operation 603, the processor may identify a second drag input received in a second direction 630 through the display device 660. In operation 604, in response to the second drag input being identified, the processor may control the display device 660 such that an area 633 including the first line, the second line, and the third line is displayed at a location which corresponds to the second drag input.

According to an embodiment, in operation 605, the processor may identify a third drag input received in a third direction 625 through the display device 660. Herein, the third drag input may be used as a command to perform a role contrary to the first drag input received in the first direction 620. For example, in operation 606, in response to the third drag input being identified, the processor may release setting of the first line 623, the second line 627, and the third line 629, and control the display device 660 such that the area including the first line 623, the second line 627 and the third line 629 is no longer displayed.

According to an embodiment, in operation 607, the processor may identify a fourth drag input received in a fourth direction 640 through the display device 660. In operation 606, in response to the fourth drag input being identified, the processor may control the display device 660 such that an area 643 including the first line, the second line, and the third line is displayed at a location which corresponds to the fourth drag input.

Figure 7:
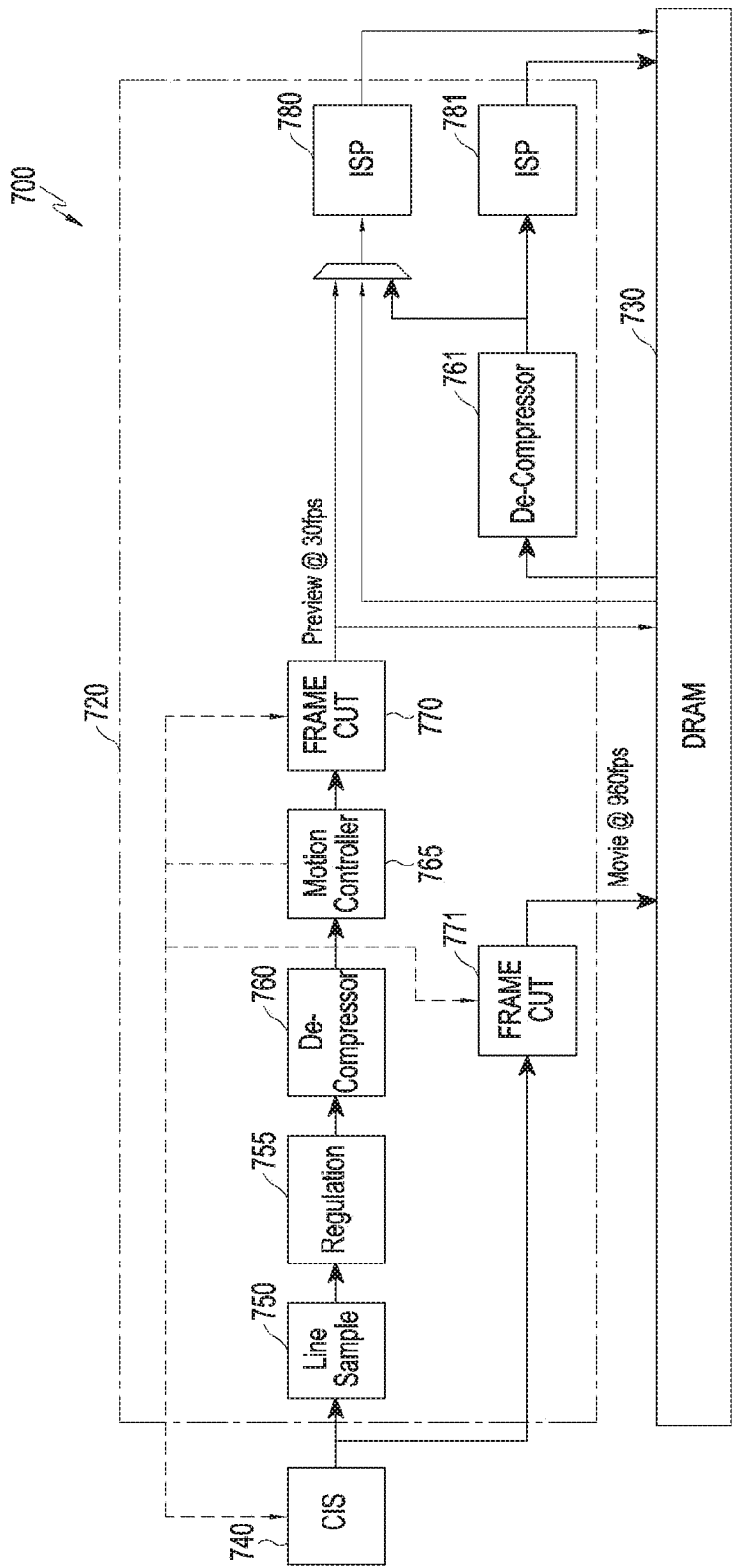
FIG. 7 is a block diagram illustrating an electronic device which may perform various embodiments.

FIG. 7 is a block diagram illustrating an electronic device which may perform various embodiments.

According to an embodiment, an electronic device 700 may include at least one of a processor 720 (e.g., a processor 120 in FIG. 1), a memory 730 (e.g., a memory 130 in FIG. 1), and a CMOS image sensor (CIS) 740 (e.g., an image sensor 230 in FIG. 2). Components included in the electronic device 700 may correspond to components included in an electronic device 101 in FIG. 1, and the electronic device 700 may include some or all of the components included in the electronic device 101 in FIG. 1 as well as the components disclosed in FIG. 7.

Further, the processor 720 may control operations of the components included in the electronic device 700 and may perform instructions stored in the memory 730 of the electronic device 700. Further, the processor 720 may include modules capable of performing various functions. For example, the processor 720 may include a line sampling module 750, a regulation module 755, decompression modules 760 and 761, a motion controller 765, frame-cut modules 770 and 771, and image signal processors 780 and 781.

The line sampling module 750 may perform line sampling on at least one image frame which is compressed and transferred by the CIS 740. According to an embodiment, at least one image frame obtained from a camera module (e.g., a camera module 180 in FIG. 1) may be compressed in line units through a compression module (not shown) included in the CIS 740 of the camera module, and then transferred to the processor 720 through an interface (e.g., an MIPI). The line sampling module 750 of the processor 720 may decrease amount of a signal transferred to the regulation module 755 and the decompression module 760 by performing line sampling on the image frame transferred from the CIS 740. Herein, line sampling may mean an operation of deleting, according to a preset period, some of image data which is stacked during a process in which an image frame is compressed. For example, if the line sampling is performed on an image frame transferred from the CIS 740, image data which is stacked oddly or evenly among image data which is stacked may be deleted.

The regulation module 755 may store an input signal in at least one static random access memory (SRAM) located inside the regulation module 755, and then output the input signal at a speed which is relatively lower than a speed at which the input signal is received. For example, the regulation module 755 may receive a signal outputted from the line sampling module 750 and store the signal in the at least one SRAM located inside the regulation module 755. The regulation module 755 may output a signal stored in the at least one SRAM at a relatively low speed in its stored order. For example, a period or a wavelength of the signal outputted from the line sampling module 750 may become longer while passing through the regulation module 755.

The decompression modules 760 and 761 may decompress a compressed image frame. According to an embodiment, the decompression module 760 may receive the signal outputted from the regulation module 755 and then decompress the received signal.

The motion controller 765 may detect movement of an external object by using the signal outputted from the decompression module 760. For example, at least one external object may be commonly included in a plurality of image frames obtained through the camera module. The motion controller 765 may detect a change in a location of the at least one external object through a process of comparing the location of the external objects included in the plurality of image frames. Meanwhile, if it is determined that high-speed capturing or high-speed recording is required according to the change in the location of the at least one external object, the motion controller 765 may adjust up a read-out speed of the CIS 740 from a first frame rate (e.g., 30 fps) to a second frame rate (e.g., 960 fps) by transferring at least one signal to the CIS 740. Further, if it is determined that the high-speed capturing or the high-speed recording is required according to the change in the location of the at least one external object, the motion controller 765 may adjust a frame rate of each of image frames outputted from the frame-cut modules 770 and 771 by transferring at least one signal to the frame-cut modules 770 and 771 such that some of image frames inputted to the frame-cut modules 770 and 771 is deleted and remaining image frames of the inputted image frames is deleted is outputted.

The frame-cut modules 770 and 771 may implement the same effect as a fact that image frames are obtained at the first frame rate by deleting at least some of image frames which are obtained at the second frame rate (e.g., 960 fps) higher than the first frame rate (e.g., 30 fps) in the CIS 740. According to an embodiment, if a plurality of first image frames which are obtained at the second frame rate in the CIS 740 are inputted, the frame-cut modules 770 and 771 may delete at least some of the plurality of first image frames, and then may output only a plurality of second image frames. At this time, a period among the plurality of second image frames outputted from the frame-cut modules 770 and 771 may be set to be the same as a period among the image frames which are obtained at the first frame rate in the CIS 740. For example, the frame-cut modules 770 and 771 may output the plurality of second image frames such as image frames which are obtained according to 30 fps in the CIS 740 by deleting the plurality of first image frames which are obtained according to 960 fps in the CIS 740 at a rate of 31 per 32. The frame-cut modules 770 and 771 may transfer the plurality of second image frames to the memory 730 or the image signal processors 780 and 781.

The image signal processors 780 and 781 may perform one or more processings for an image obtained through an image sensor (e.g., the image sensor 230 in FIG. 2) or an image stored in a memory (e.g., a memory 250 in FIG. 2). The one or more processings may include, for example, depth map generation, three-dimensional modeling, panorama generation feature point extraction, image synthesis, or image compensation (e.g., noise reduction, resolution adjustment, brightness adjustment, blurring, sharpening, or softening).

Meanwhile, it will be noted that some of components disclosed in FIG. 7 may be implemented with a plural form or omitted according to a design, and an order or arrangement of the some of components disclosed in FIG. 7 may be changed according to various embodiments.

Figure 8:
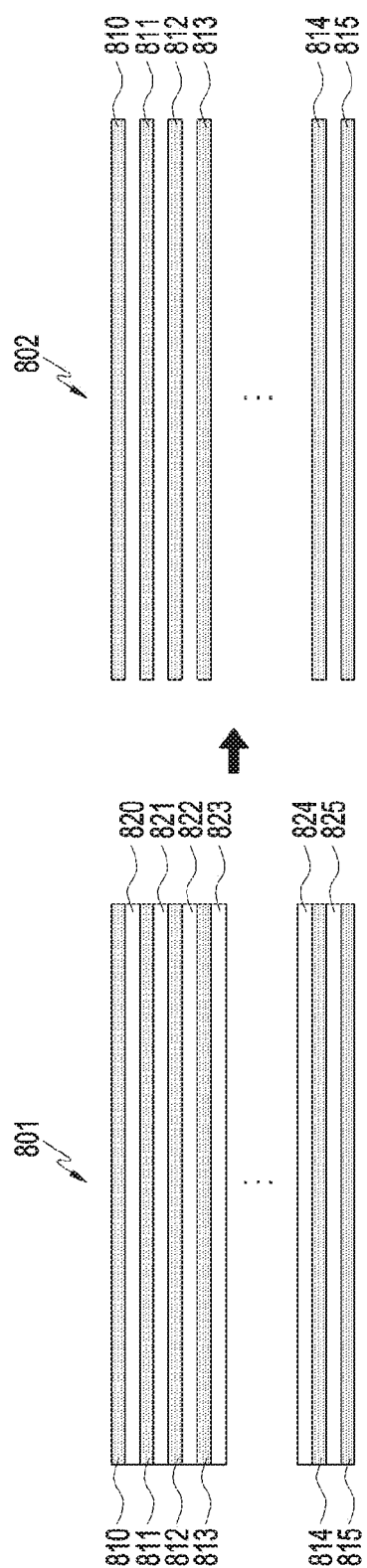
FIG. 8 is a diagram for describing a method for performing line sampling in an electronic device according to various embodiments.

FIG. 8 is a diagram for describing a method for performing line sampling in an electronic device according to various embodiments.

According to an embodiment, an electronic device (e.g., an electronic device 101 in FIG. 1) may include an image sensor (e.g., an image sensor 230 in FIG. 2) and a processor (e.g., a processor 120 in FIG. 1). Also, the processor may include a line sampling module (e.g., a line sampling module 750 in FIG. 7) capable of performing line sampling on an image frame received from the image sensor.

According to an embodiment, the image sensor may obtain at least one image frame for an external object, and then compress the obtained image frame through a compression module included in the image sensor. Herein, when compressing an image frame, the image sensor may use a method of stacking image data included in the image frame in line units. For example, referring to FIG. 8, it is possible to identify an image frame 801 which is stacked in line units. In a process in which the image frame 801 is compressed through the compression module, the image frame 801 may have a structure that first image data 810, 811, 812, 813, 814, and 815, and second image data 820, 821, 823, 824, and 825 are alternately stacked.

According to an embodiment, a line sampling module may receive the image frame 801 compressed in the image sensor. Further, the line sampling module may perform line sampling on the received image frame 801. Herein, line sampling may mean an operation of deleting, according to a preset period, some of image data which is stacked in a process in which an image frame is compressed. For example, if the line sampling is performed on an image frame received from the image sensor, image data which is stacked evenly (or oddly) among image data which is stacked may be deleted.

An image frame 802 in FIG. 8 is a result of performing line sampling on the image frame 801. Like this, the line sampling module may reduce a size of the image frame 801 by performing line sampling to delete the second image data 820, 821, 823, 824, and 825 from the image frame 801. Meanwhile, the processor may perform decompression for an image frame and generation of video in real time by using the image frame 802 whose size is reduced through line sampling.

Figure 9:
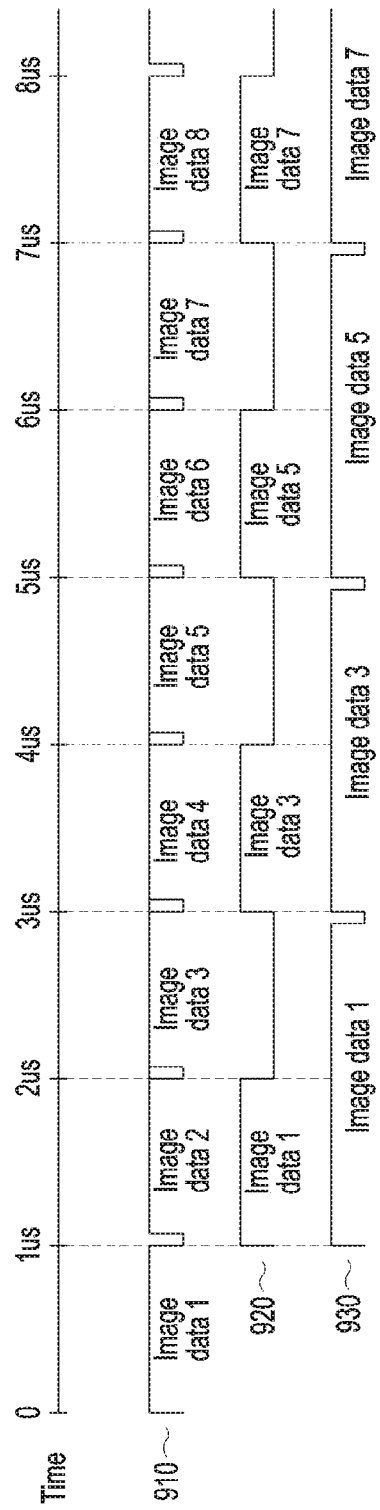
FIG. 9 is a diagram for describing a method for performing regulation in an electronic device according to various embodiments.

FIG. 9 is a diagram for describing a method for performing regulation in an electronic device according to various embodiments.

According to an embodiment, a processor (e.g., a processor 120 in FIG. 1) of an electronic device (e.g., an electronic device 101 in FIG. 1) may include a regulation module (e.g., a regulation module 755 in FIG. 7) which may adjust an output speed of a signal by storing an input signal in at least one memory (e.g., a buffer memory) and then outputting a stored signal according to a preset time interval.

According to an embodiment, the regulation module may receive image data which is received from an image sensor and is line-sampled through a line sampling module (e.g., a line sampling module 750 in FIG. 7). The regulation module may store the received image data in at least one memory (e.g., an SRAM) included in the regulation module. Herein, the at least one memory may serve as a buffer memory used to adjust a speed at which data is transferred.

According to an embodiment, the regulation module may output image data stored in the at least one memory according to a preset time interval. For example, the regulation module may store a signal (image data) inputted according to a first period in the at least one memory, and then output the stored signal (image data) according to a second period. At this time, the regulation module may perform reception of a signal, storage of the received signal, and output of the stored signal in real time. Meanwhile, according to an embodiment, the second period may be set to twice the first period.

Referring to FIG. 9, a graph 910 shows a signal inputted to the line sampling module (e.g., a line sampling module 750 in FIG. 7), for example, a signal outputted from the image sensor. A graph 920 shows a signal inputted to the regulation module (e.g., a regulation module 755 in FIG. 7), for example, a signal outputted from the line sampling module. A graph 930 shows a signal outputted from the regulation module.

For example, as in the graph 910, if one image data per 1 µs is outputted from the image sensor, one image data per 1 µs may also be inputted to the line sampling module.

The line sampling module may delete at least some of inputted image data according to a specific period. For example, the line sampling module may delete even-numbered inputted image data (e.g., Image data 2, Image data 4, Image data 6, Image data 8, etc.), in this case, a signal outputted from the line sampling module may appear as in the graph 920.

The regulation module may adjust a period of inputted image data (e.g., Image data 1, Image data 3, Image data 5, Image data 7, etc.) and then output the image data whose period is adjusted. For example, the regulation module may output image data which is inputted at a period of 1 µs, as shown in the graph 920, at a period of 2 µs, as shown in the graph 930. For example, time which is saved as some of image data constituting an image frame is deleted through the line sampling module may be used when the regulation module reads, writes, and outputs inputted image data.

Figure 10:
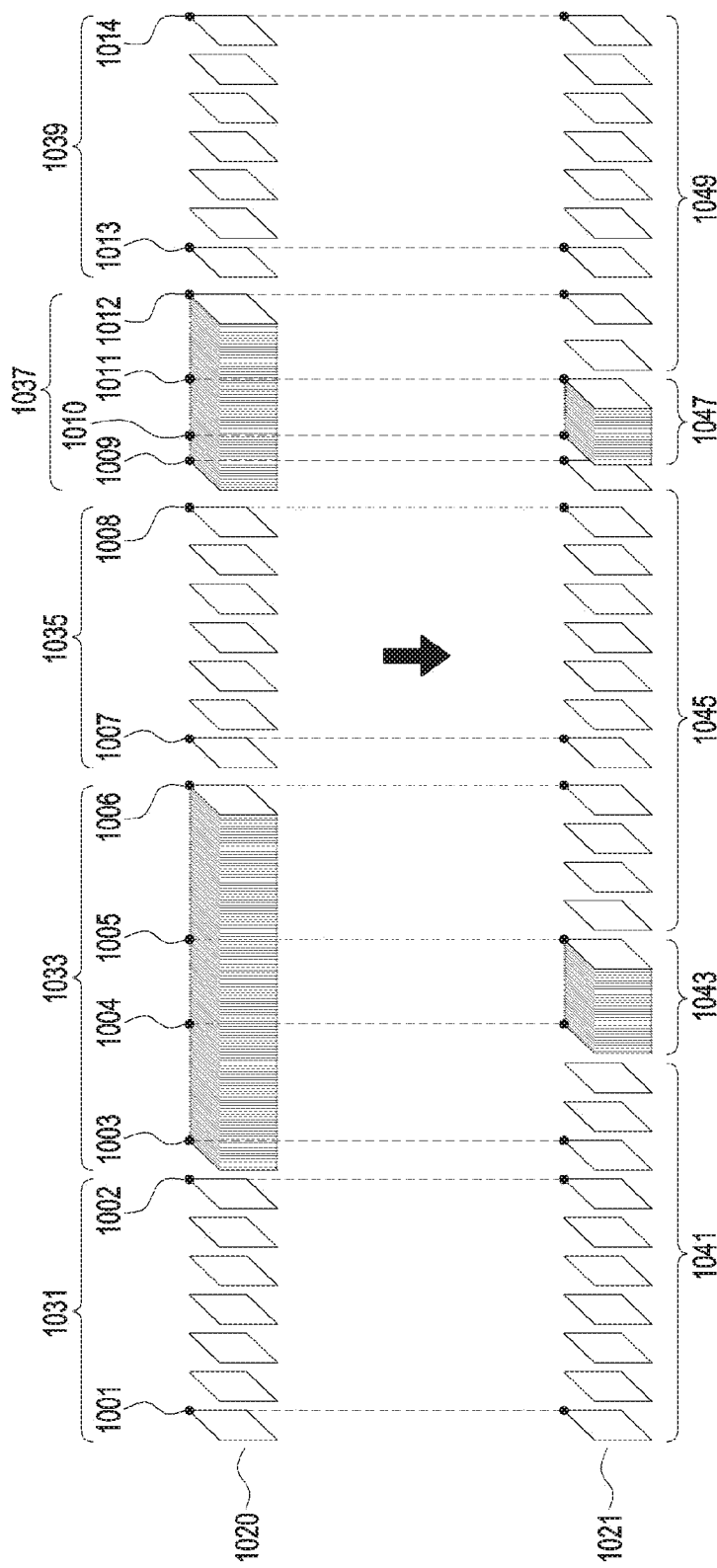
FIG. 10 is a diagram for describing a method for performing frame cut in an electronic device according to various embodiments.

FIG. 10 is a diagram for describing a method for performing frame cut in an electronic device according to various embodiments.

According to an embodiment, a processor (e.g., a processor 120 in FIG. 1) of an electronic device (e.g., an electronic device 101 in FIG. 1) may include a frame-cut module (e.g., frame-cut modules 770 and 771 in FIG. 1) capable of deleting at least some of inputted image frames. The frame-cut module may obtain an effect of substantially adjusting a read-out speed of an image sensor by deleting at least some of image frames obtained in the image sensor and outputting remaining image frames of the inputted image frames.

In FIG. 10, a plurality of first image frames 1020 which are obtained through an image sensor (e.g., an image sensor 230 in FIG. 2) and inputted to the frame-cut module, and a plurality of second image frames 1021 outputted from the frame-cut module are shown.

According to an embodiment, image frames included in a first group 1031 obtained from a first time point 1001 to a second time point 1002, a third group 1035 obtained from a seventh time point 1007 to an eighth time point 1008, and a fifth group 1039 obtained from a thirteenth time point 1013 to a fourteenth time point 1014 among the plurality of first image frames 1020 may be image frames which are obtained at a first frame rate (e.g., 30 fps) in the image sensor. Further, image frames included in a second group 1033 obtained from a third time point 1003 to a sixth time point 1006, and a fourth group 1037 obtained from a ninth time point 1009 to a twelfth time point 1012 may be image frames which are obtained at a second frame rate (e.g., 960 fps) in the image sensor.

The processor may perform line sampling, regulation, and decompression on the plurality of first image frames 1020 which are obtained at the first frame rate or the second frame rate in the image sensor, and may detect movement of an external object by using the decompressed plurality of first image frames 1020. Further, the processor inputs the plurality of first image frames 1020 to the frame-cut module to delete at least some of the plurality of first image frames 1020, thereby preventing that image frames which do not need to be obtained at the second frame rate among the plurality of first image frames 1020 are stored in a memory or processed by an image signal processor.

For example, the frame-cut module may receive the plurality of first image frames 1020 from a motion controller (e.g., a motion controller 765 in FIG. 7). At this time, the motion controller may identify movement of an external object (e.g., an external object 350 in FIG. 3) which is commonly included in the plurality of first image frames 1020 by using the plurality of first image frames 1020. Further, the motion controller may determine a distance between the external object and a first line (e.g., a first line 310 in FIG. 3) which is set on a display device (e.g., a display device 160 in FIG. 1) satisfies a first condition according to the movement of the identified external object. If it is determined that the distance between the first line and the external object satisfies the first condition, the motion controller may generate a first signal. Subsequently, the motion controller may determine whether the distance between the first line and the external object satisfies a second condition according to continuous movement of the identified external object. If it is determined that the distance between the first line and the external object satisfies the second condition, the motion controller may generate a second signal.

Herein, the first signal is a command related to start of high-speed capturing, and the image sensor receiving the first signal may adjust up a read-out speed from the first frame rate (e.g. 30 fps) to the second frame rate (e.g. 960 fps). Further, the second signal is a command related to start of high-speed recording, and the frame-cut module (e.g., the frame-cut modules 770 and 771 in FIG. 7) that receives the second signal may store, in the memory, or transfer, to the image signal processor, only image frames which are obtained from a time point at which the second signal is generated by deleting at least some of image frames which are obtained at the second frame rate through the image sensor.

According to an embodiment, the third time point 1003 and the ninth time point 1009 are time points at which the distance between the first line and the external object is determined to satisfy the first condition by the motion controller, and may be time points at which the first signal is generated. In response to receiving the first signal from the motion controller, the image sensor may adjust up a read-out speed to the second frame rate higher than the first frame rate, and accordingly, high-speed capturing may be started from the third time point 1003 and the ninth time point 1009.

Further, the fourth time point 1004 and the tenth time point 1010 are time points at which the distance between the first line and the external object is determined to satisfy the second condition by the motion controller, and may be time points at which the second signal is generated. In response to receiving the second signal from the motion controller, the frame-cut module may determine that image frames obtained from the fourth time point 1004 and the tenth time point 1010 are used for high-speed recording. Meanwhile, the fifth time point 1005 and the eleventh time point 1011 are time points at which the motion controller determines that the distance between the first line and the external object does not satisfy the second condition, and may be time points at which the third signal is generated. In response to receiving the third signal from the motion controller, the frame-cut module may determine that image frames obtained from the fifth time point 1005 and the eleventh time point 1011 are not used for high-speed recording.

Further, the sixth time point 1006 and the twelfth time point 1012 are time points at which the motion controller determines that the distance between the first line and the external object does not satisfy the first condition, and may be time points at which the fourth signal is generated. In response to receiving the fourth signal from the motion controller, the image sensor may adjust down the read-out speed to the first frame rate lower than the second frame rate, and accordingly, normal capturing may be started from the sixth time point 1006 and the twelfth time point 1012.

According to an embodiment, the frame-cut module may determine that the high-speed recording is not required for image frames which are obtained until the fourth time point 1004 (or the tenth time point 1010) at which the second signal is received among the plurality of first image frames 1020 which are obtained at the second frame rate from the third time point 1003 (or the ninth time point 1009). Accordingly, after deleting at least some of image frames which are obtained from the third time point 1003 (or the ninth time point 1009) to the fourth time point 1004 (or the tenth time point 1010), the frame-cut module may store, in a memory, only remaining image frames, or transfer the remaining image frames to the image signal processor.

As the second signal is received at the fourth time point 1004 (or the tenth time point 1010), the frame-cut module may determine that the high-speed recording is required for image frames which are obtained until the fourth time point 1004 (or the tenth time point 1010). Accordingly, the frame-cut module may store, in the memory, all of image frames which are obtained from the fourth time point 1004 (or the tenth time point 1010), or transfer all of the image frames to the image signal processor.

As the third signal is received at the fifth time point 1005 (or the eleventh time point 1011), the frame-cut module may determine that the high-speed recording is not required for image frames which are obtained from the fifth time point 1005 (or the eleventh time point 1011). Accordingly, after deleting at least some of image frames which are obtained from the fifth time point 1005 (or the eleventh time point 1011), the frame-cut module may store only remaining image frames in the memory, or transfer the remaining image frames to the image signal processor.

According to an embodiment, the frame-cut module receiving the plurality of first image frames 1020 deletes at least some of the plurality of first image frames 1020 based on a signal received from the motion controller, and then outputs the plurality of second image frames 1021. As the at least some of the plurality of first image frames 1020 are deleted, image frames included in the sixth group 1041 obtained from the first time point 1001 to the fourth time point 1004, the eighth group 1045 obtained from the fifth time point 1005 to the tenth time point 1010 and the tenth group 1049 obtained from the eleventh time point 1011 to the fourteenth time point 1014 among the plurality of second image frames 1021 may have substantially the same period as image frames obtained at the first frame rate (e.g., 30 fps) in the image sensor. Further, image frames included in the seventh group 1043 obtained from the fourth time point 1004 to the fifth time point 1005 and the ninth group 1047 obtained from the tenth time point 1010 to the eleventh time point 1011 among the plurality of second image frames 1021 may have substantially the same period as image frames obtained at the second frame rate (e.g., 960 fps) in the image sensor.

Figure 11A:
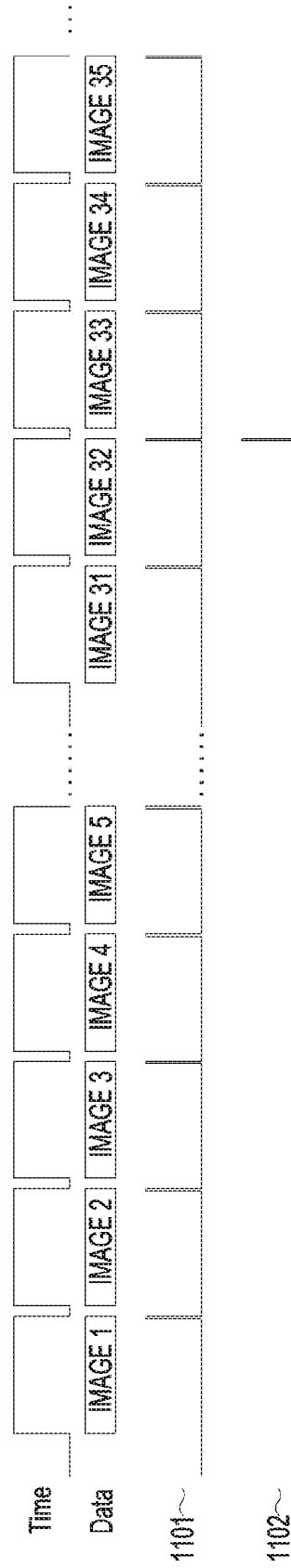
FIG. 11A is a diagram for describing a method for storing a plurality of images which are obtained through an image sensor in a memory in an electronic device according to various embodiments.
Figure 11B:
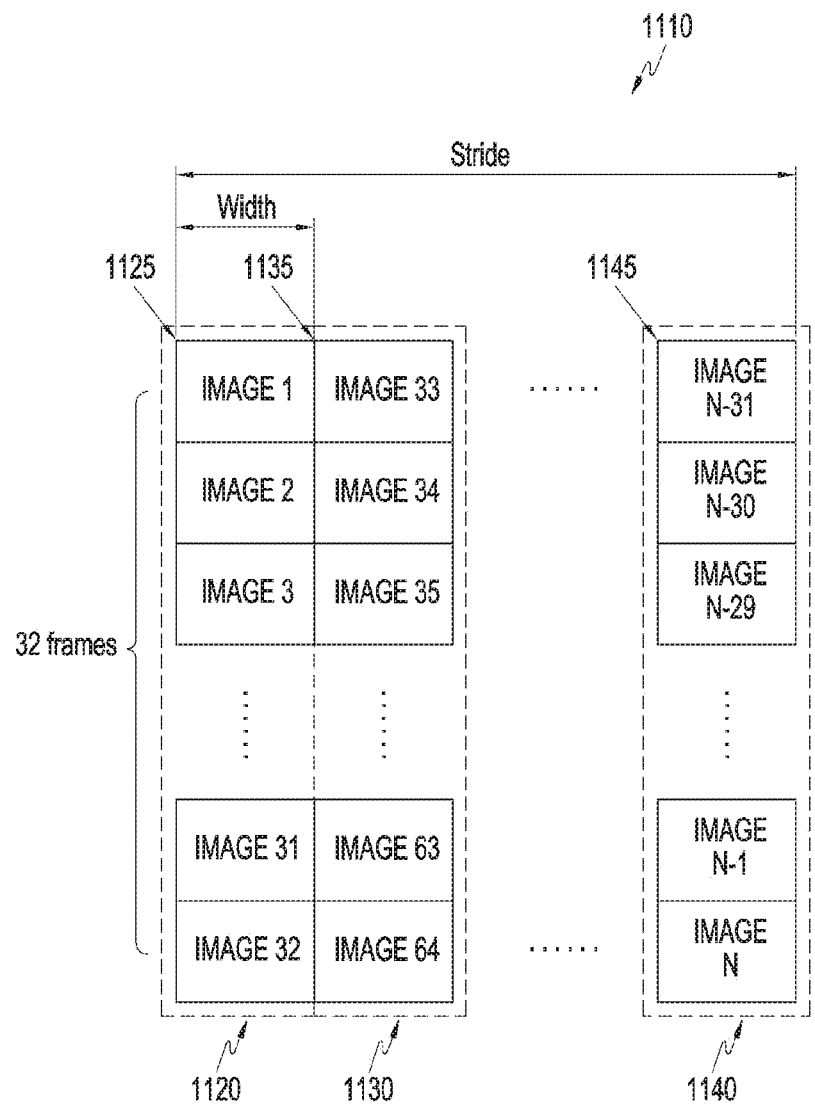
FIG. 11B is a diagram for describing a method for storing a plurality of images which are obtained through an image sensor in a memory in an electronic device according to various embodiments.
Figure 11C:
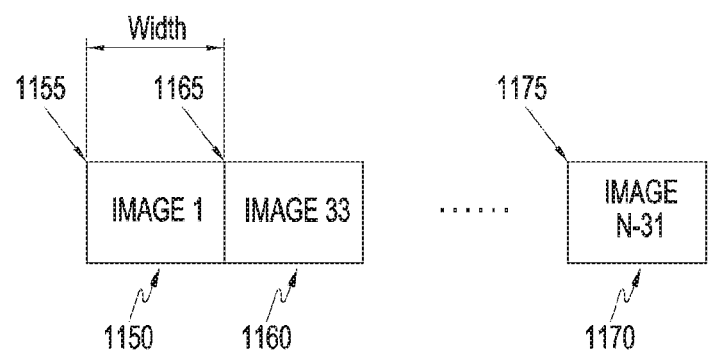
FIG. 11C is a diagram for describing a method for storing a plurality of images which are obtained through an image sensor in a memory in an electronic device according to various embodiments.

FIG. 11A is a diagram for describing a method for storing a plurality of images which are obtained through an image sensor in a memory in an electronic device according to various embodiments. FIG. 11B is a diagram for describing a method for storing a plurality of images which are obtained through an image sensor in a memory in an electronic device according to various embodiments. FIG. 11C is a diagram for describing a method for storing a plurality of images which are obtained through an image sensor in a memory in an electronic device according to various embodiments.

Referring to FIG. 11A, a processor may receive image frames obtained in an image sensor (e.g., an image sensor 230 in FIG. 2) at regular time intervals. In order to distinguish each of image frames received from the image sensor from other image frames, the processor may generate a first interrupt signal 1101 whenever each of the image frames is received. For example, if a read-out speed of the image sensor is set to 960 fps, the processor may generate the first interrupt signal 1101 about every 1 ms (to be exact, 1/960 s).

Meanwhile, in order to divide image frames received from the image sensor into groups with a designated size in their obtained order and manage them by group, the processor may generate a second interrupt signal 1102 whenever a designated number of image frames are received. For example, if the read-out speed of the image sensor is set to 960 fps, the processor may generate the second interrupt signal 1102 about every 32 ms (to be exact, 32/960 s) in order to manage the image frames received from the image sensor in their obtained order in units of 32 image frames.

In FIG. 11B, a data structure 1110 indicating a scheme in which groups 1120, 1130, and 1140 each including 32 image frames are stored in a memory of an electronic device is shown. According to an embodiment, the processor may use the data structure 1110 when grouping image frames which are obtained at 960 fps from the image sensor in units of 32 image frames and store them in the memory. The first group 1120 may include a first image frame to a 32th image frame, the second group 1130 may include a 33th image frame to a 64th image frame, and an Nth group 1140 may include an N−31th image frame to an Nth image frame. Further, first information 1125 which is address information of the first group 1120 may be set in the first image frame stored at the beginning of the first group 1120, second information 1135 which is address information of the second group 1130 may be set in the 33th image frame stored at the beginning of the second group 1130, and third information 1145 which is address information of the Nth group 1140 may be set in the N−31th image frame stored at the beginning of the Nth group 1140. Meanwhile, the data structure 1110 may be used when image frames included in the seventh group 1043 and the ninth group 1047 in FIG. 10 are stored in a memory.

In FIG. 11C, a scheme of selecting only one image frame per group, in the groups 1120, 1130, and 1140 each including 32 image frames, and storing it in the memory of the electronic device is shown. According to an embodiment, the processor may store, in the memory, only one image frame every 32 image frames obtained at 960 fps from the image sensor. For example, even though 960 image frames are obtained per second (for example, 960 fps) in the image sensor according to a signal related to start of high-speed capturing, if a signal related to start of high-speed recording is not identified, the processor may delete, at a rate of 31 per 32, image frames which are obtained at 960 fps, and store only one remaining image frame in the memory. Accordingly, only the first image frame 1150, the 33th image frame 1160, and the N−31th image frame 1170 may be stored in the memory. In this case, fourth information 1155 which is address information of a first image frame may be set in the first image frame 1150, fifth information 1165 which is address information of a second image frame may be set in the second image frame 1160, and sixth information 1175 which is address information of an N−31th image frame may be set in the Nth−31st image frame 1170.

Meanwhile, numbers presented in the above-described embodiments are provided to aid understanding of the present invention, and the present invention is not to be interpreted as being limited by the numbers presented in the above-described embodiment. For example, those skilled in the art will readily understand that the number of image frames which may be included in each group may be variously set according to a read-out speed of an image sensor.

Figure 12A:
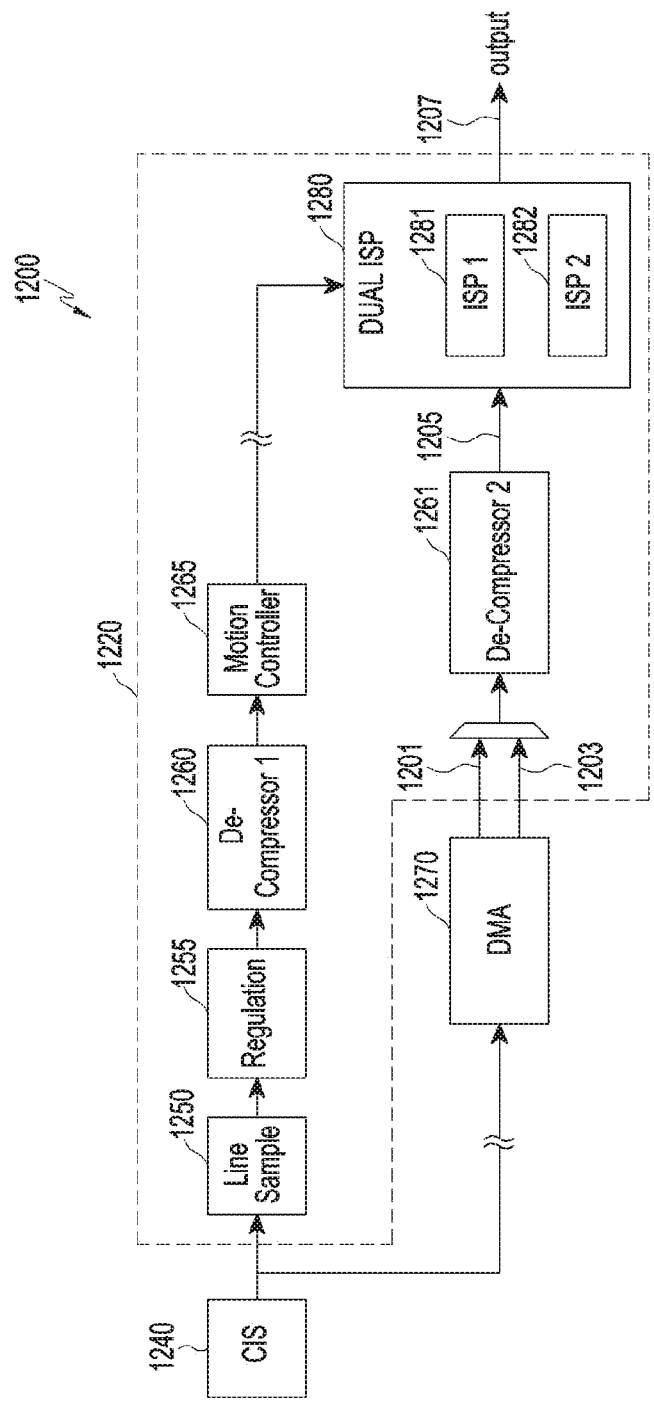
FIG. 12A is a diagram for describing a method for using a plurality of image signal processors in an electronic device according to various embodiments.
Figure 12B:
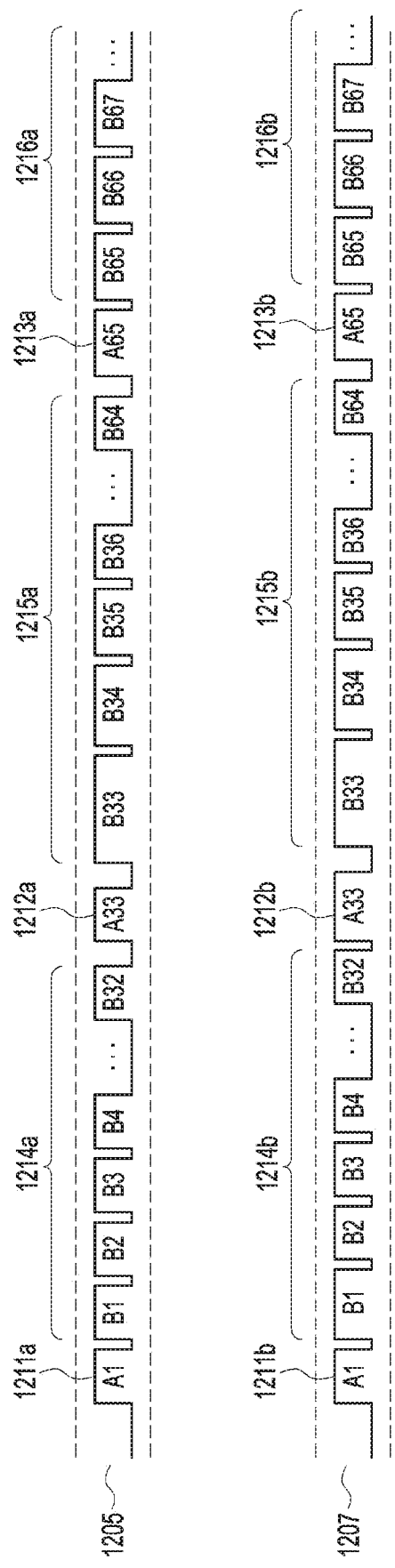
FIG. 12B is a diagram for describing a method for using a plurality of image signal processors in an electronic device according to various embodiments.

FIG. 12A is a diagram for describing a method for using a plurality of image signal processors in an electronic device according to various embodiments. FIG. 12B is a diagram for describing a method for using a plurality of image signal processors in an electronic device according to various embodiments.

According to an embodiment, an electronic device 1200 may include at least one of a processor 1220 (e.g., a processor 120 in FIG. 1), a CMOS image sensor (CIS) 1240 (e.g., an image sensor 230 in FIG. 2), and a direct memory access (DMA) 1270. The processor 1220 may control an operation of components included in the electronic device 1200 and may perform instructions stored in a memory of the electronic device 1200. The processor 1220 may include modules capable of performing various functions. For example, the processor 1220 may include a line sampling module 1250, a regulation module 1255, decompression modules 1260 and 1261, a motion controller 1265, and a dual image signal processor 1280. Meanwhile, the electronic device 1200 may include at least some of components of an electronic device 700 disclosed in FIG. 7, and each of the components of the electronic device 1200 may perform the same role as each of the components of the electronic device 700.

The DMA 1270 is a kind of controller capable of directly accessing a memory and reading at least one data, and may perform a role to prevent a processor from being interrupted by a memory access request of the components of the electronic device. According to an embodiment, the DMA 1270 may read a plurality of first image frames 1201 used to provide a preview image among data stored in the memory, and a plurality of second image frames used to generate a slow motion image, and transfer the plurality of first image frame 1201 and the second image frame 1203 to the decompression module 1261.

The decompression module 1261 may decompress the first image frame 1201 and the second image frame 1203 received from the DMA 1270, and transfer a plurality of third image frames 1205 integrated after decompression to the dual image signal processor 1280. Meanwhile, according to an embodiment, the plurality of third image frames 1205 outputted from the decompression module 1261 may have a form shown in a graph 1205 in FIG. 12B. For example, the plurality of third image frames 1205 may be composed with a form that a first image frame 1211a, a second image frame 1212a, and a third image frame 1213a included in the plurality of first image frames 1201, and a fourth image frame 1214a, a fifth image frame 1215a, and a sixth image frame 1216a included in the plurality of second image frames 1203 are arranged in their obtained order through an image sensor.

The dual image signal processor 1280 includes the first image signal processor 1281 and the second image signal processor 1282, and may use the first image signal processor 1281 and the second image signal processor 1282 in parallel upon processing image frames. According to an embodiment, the dual image signal processor 1280 may generate at least one image 1207 by using the plurality of third image frames 1205 received through the decompression module 1261. At this time, the dual image signal processor 1280 may encode image frames included in the plurality of third image frames 1205 in real time by using the first image signal processor 1281 and the second image signal processor 1282 in parallel. For example, the dual image signal processor 1280 may perform encoding in an arrangement order of the image frames included in the plurality of third image frames 1205. Accordingly, at least one image 1207 outputted from the dual image signal processor 1280 may be composed with a form that a 1-1th image frame 1211b corresponding to a first image frame 1211a, a 1-2th image frame 1212b corresponding to a second image frame 1212a, a 1-3th image frame 1213b corresponding to a third image frame 1213a, a 4-1th image frame 1214b corresponding to a fourth image frame 1214a, a 5-1th image frame 1215b corresponding to a fifth image frame 1215a, and a 6-1th image frame 1216b corresponding to a sixth image frame 1216a are arranged in their obtained order through the image sensor.

Figure 13:
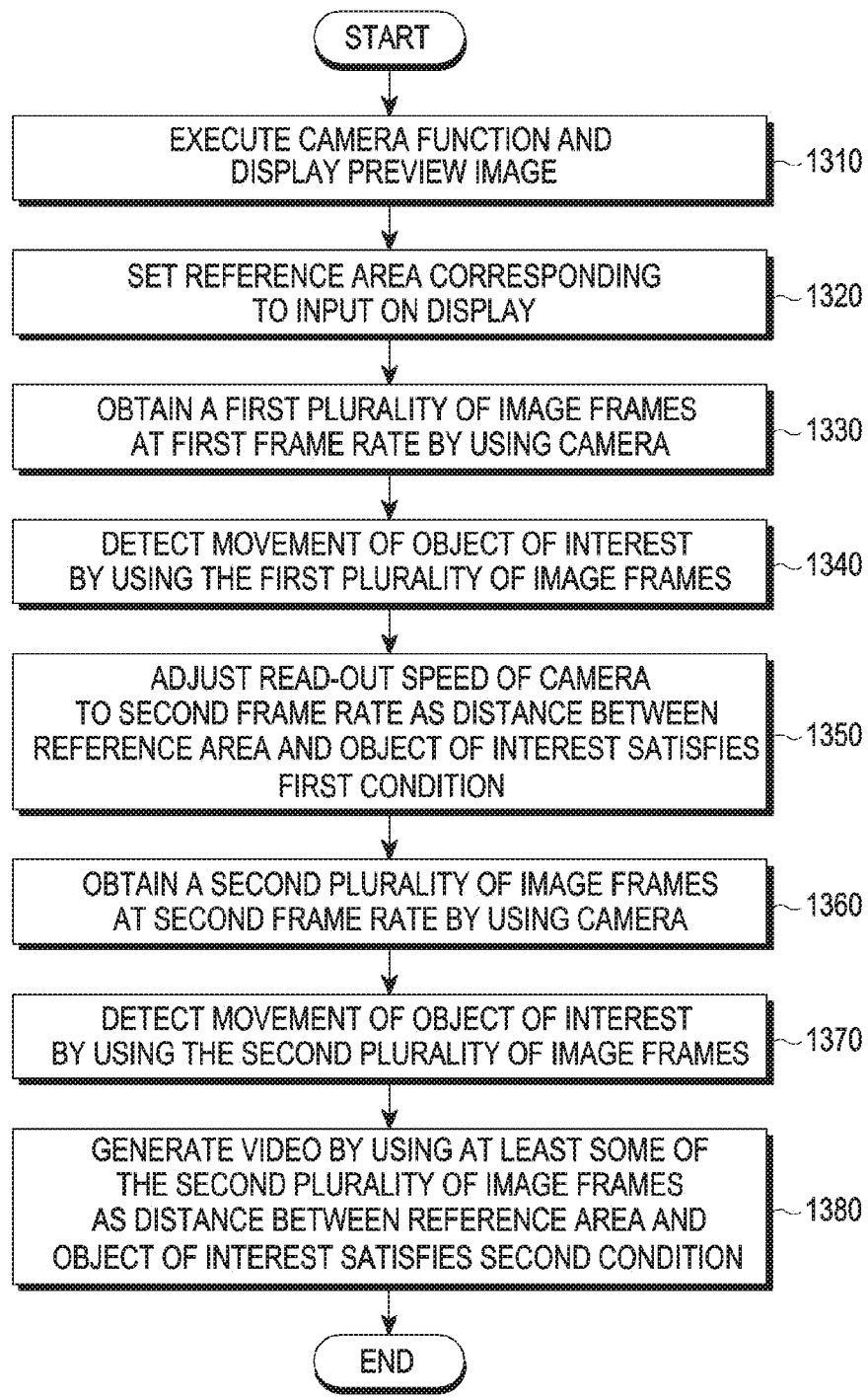
FIG. 13 is a flowchart for describing a method for performing high-speed capturing and high-speed recording according to various embodiments.

FIG. 13 is a flowchart for describing a method for performing high-speed capturing and high-speed recording according to various embodiments.

A subject which performs the method may be a processor in an electronic device (e.g., an electronic device 101 in FIG. 1) including a display device (e.g., a display device 160 in FIG. 1), a camera module (e.g., a camera module 180 in FIG. 1), and the processor (e.g., a processor 120 in FIG. 1).

According to one embodiment, in operation 1310, the processor may control the camera module of the electronic device and execute at least one function of the camera module. Further, the processor may control the display device a display) of the electronic device, and display a preview image which corresponds to the executed at least one function of the camera module by using the display device.

In operation 1320, the processor may set at least one reference area on the display device based on a drag input or hovering input inputted on the display device or an input which is through an input device (e.g., an input device 150 in FIG. 1) of the electronic device. For example, the processor may set a first line (e.g., a first line 310 in FIG. 3) in response to receiving the drag inputted on the display device. The set at least one reference area may be displayed on the display device with a dotted line, a solid line, or a colored area of a designated size.

In operation 1330, the processor may obtain a plurality of first image frames at a first frame rate (e.g., 30 fps) by using the camera module. According to an embodiment, the plurality of first image frames obtained at the first frame rate may be used to provide a preview image through the display device.

In operation 1340, the processor may detect movement of an object of interest by using the plurality of first image frames. At least one object of interest may be commonly included in the plurality of first image frames obtained through the camera module. The processor may identify the movement of the object of interest by comparing the plurality of first image frames. The processor may identify a moving speed and a moving direction of the object of interest. Meanwhile, the processor may designate the object of interest according to a user's input. Also, the processor may designate an object for which movement is detected as the object of interest. A marker (e.g., a square box, a colored border, etc.) indicating that at least one object is designated as the object of interest may be displayed in the at least one object designated as the object of interest, and the marker may be displayed by moving together according to the movement of the object of interest.

In operation 1350, the processor may determine whether a distance between a preset reference area and the object of interest satisfies a first condition. For example, if a distance from at least one point included in the reference area to at least one point which corresponds to the object of interest satisfies a preset condition, the processor may determine that the first condition is satisfied. If it is determined that the first condition is satisfied, the processor may adjust a read-out speed of an image sensor included in the camera module to a second frame rate (e.g., 960 fps) higher than the first frame rate. For example, the processor may start high-speed capturing in response to the satisfaction of the first condition.

In operation 1360, the processor may obtain a plurality of second image frames at the second frame rate by using the camera module. According to an embodiment, at least some of the plurality of second image frames may be used to provide a preview image through the display device.

In operation 1370, the processor may detect movement of the object of interest by using the plurality of second image frames. At least some of the plurality of second image frames may be used to more accurately identify the movement of the object of interest. For example, the plurality of first image frames are obtained at 30 fps, but the second plurality of image frames are obtained at 960 fps, so the movement of the object of interest may be precisely identified if the plurality of second image frames rather than the plurality of first image frames are used.

In operation 1380, the processor may determine whether the distance between the preset reference area and the object of interest satisfies a second condition. At this time, the distance according to the second condition may be shorter than the distance according to the first condition. That is, for example, in a case that the object of interest approaches the preset reference area, it may be determined that the first condition is satisfied, and then the second condition is satisfied. If it is determined that the second condition is satisfied, the processor may generate video by using at least some of the plurality of second image frames obtained at the second frame rate. The video may be generated by using only a plurality of second image frames obtained from a time point at which it is determined that the second condition is satisfied. For example, the processor may start high-speed recording in response to the satisfaction of the second condition.

Meanwhile, some of operations disclosed in FIG. 13 may be omitted or repeated multiple times. Further, it will be apparent that each of the operations disclosed in FIG. 13 is considered as an embodiment, and it will be noted that one operation may not be limitedly interpreted as being dependent on another operation.

Figure 14:
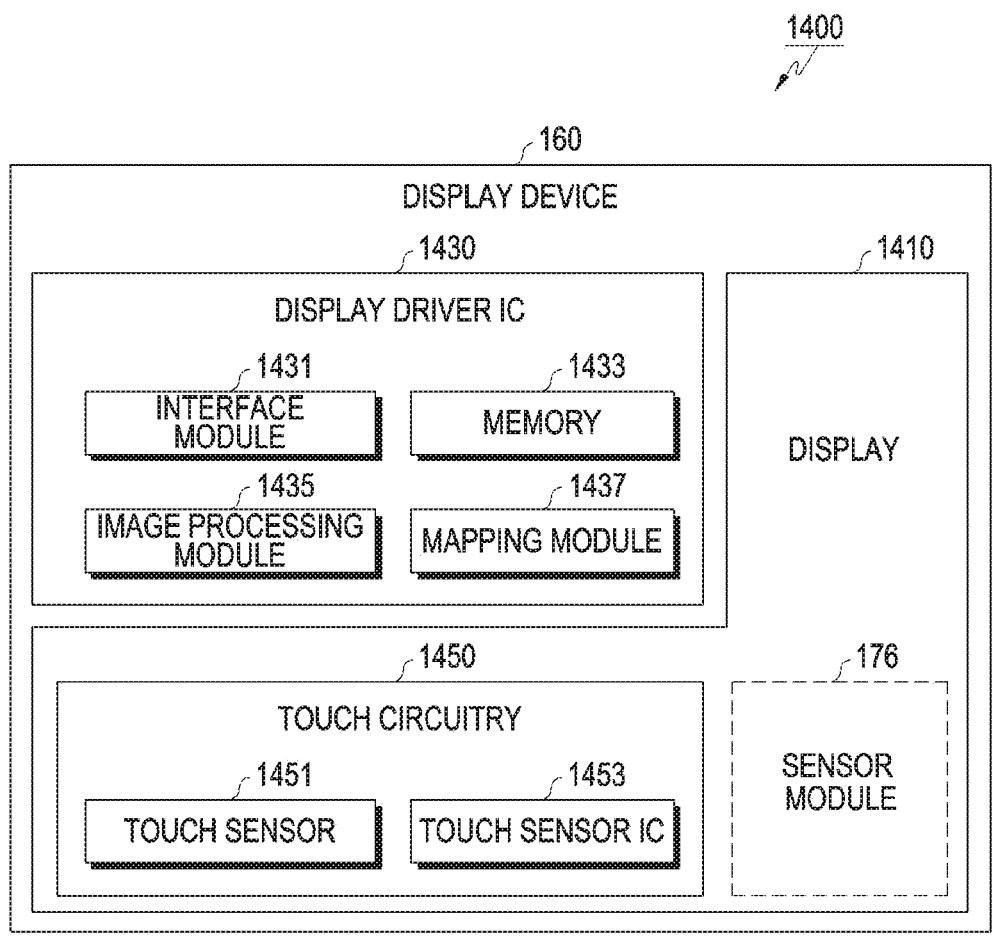
FIG. 14 is a block diagram illustrating a display device according to various embodiments.

FIG. 14 is a block diagram 1400 illustrating the display device 160 according to various embodiments. Referring to FIG. 14, the display device 160 may include a display 1410 and a display driver integrated circuit (DDI) 1430 to control the display 1410. The DDI 1430 may include an interface module 1431, memory 1433 (e.g., buffer memory), an image processing module 1435, or a mapping module 1437. The DDI 1430 may receive image information that contains image data or an image control signal corresponding to a command to control the image data from another component of the electronic device 101 via the interface module 1431. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 1430 may communicate, for example, with touch circuitry 150 or the sensor module 176 via the interface module 1431. The DDI 1430 may also store at least part of the received image information in the memory 1433, for example, on a frame by frame basis. The image processing module 1435 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 1410. The mapping module 1437 may generate a voltage value or a current value corresponding to the image data pre-processed or post-processed by the image processing module 1435. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 1410 may be driven, for example, based at least in part on the voltage value or the current value such that visual information (e.g., a text, an image, or an icon) corresponding to the image data may be displayed via the display 1410.

According to an embodiment, the display device 160 may further include the touch circuitry 1450. The touch circuitry 1450 may include a touch sensor 1451 and a touch sensor IC 1453 to control the touch sensor 1451. The touch sensor IC 1453 may control the touch sensor 1451 to sense a touch input or a hovering input with respect to a certain position on the display 1410. To achieve this, for example, the touch sensor 1451 may detect (e.g., measure) a change in a signal (e.g., a voltage, a quantity of light, a resistance, or a quantity of one or more electric charges) corresponding to the certain position on the display 1410. The touch circuitry 1450 may provide input information (e.g., a position, an area, a pressure, or a time) indicative of the touch input or the hovering input detected via the touch sensor 1451 to the processor 120. According to an embodiment, at least part (e.g., the touch sensor IC 1453) of the touch circuitry 1450 may be formed as part of the display 1410 or the DDI 1430, or as part of another component (e.g., the auxiliary processor 123) disposed outside the display device 160.

According to an embodiment, the display device 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 1410, the DDI 1430, or the touch circuitry 150)) of the display device 160. For example, when the sensor module 176 embedded in the display device 160 includes a biometric sensor (e.g., a fingerprint sensor), the biometric sensor may obtain biometric information (e.g., a fingerprint image) corresponding to a touch input received via a portion of the display 1410. As another example, when the sensor module 176 embedded in the display device 160 includes a pressure sensor, the pressure sensor may obtain pressure information corresponding to a touch input received via a partial or whole area of the display 1410. According to an embodiment, the touch sensor 1451 or the sensor module 176 may be disposed between pixels in a pixel layer of the display 1410, or over or under the pixel layer.

Figure 15:
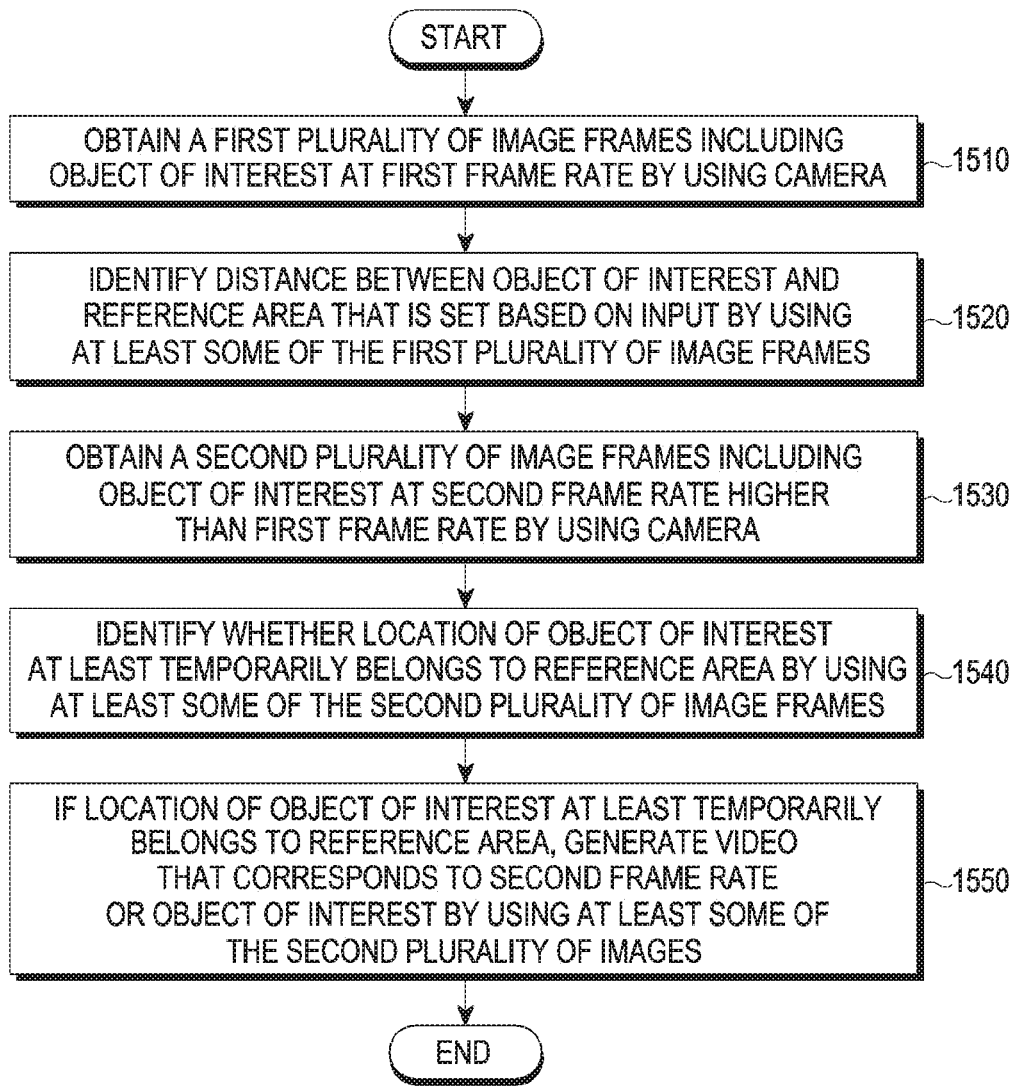
FIG. 15 is a flowchart for describing a method for selectively generating video according to various embodiments.

FIG. 15 is a flowchart describing a method for selectively generating video according to various embodiments.

A subject which performs the method may be a processor in an electronic device (e.g., an electronic device 101 in FIG. 1) including a display device (e.g., a display device 160 in FIG. 1), a camera module (e.g., a camera module 180 in FIG. 1), and the processor (e.g., a processor 120 in FIG. 1).

According to one embodiment, in operation 1510, the processor may obtain a plurality of first image frames including an object of interest (e.g., a subject) at a first frame rate by using the camera module of the electronic device. Herein, the first frame rate may mean a normal read-out speed of an image sensor included in the camera module of the electronic device. For example, the first frame rate may mean 30 fps.

In operation 1520, the processor may identify a distance between a reference area which is set based on an input and the object of interest by using at least some first image frames of the plurality of first image frames. For example, the processor may identify movement or a location of the object of interest by using the at least some first image frames of the plurality of first image frames obtained at the first frame rate. Also, based on a user's drag input received on the display of the electronic device, the processor may set a line of a length which corresponds to the drag input or an area of a size which corresponds to the drag input as a reference area. According to an embodiment, the processor may identify the distance between the set reference area and the object of interest based on the identified location of the object of interest and a location of the set reference area.

In operation 1530, if the distance between the set reference area and the object of interest satisfies a first designated condition, the processor may obtain a plurality of second image frames including the object of interest at a second frame rate higher than the first frame rate by using the camera module. For example, the processor may determine whether the distance between the set reference area and the object of interest satisfies the first designated condition based on movement of the object of interest or movement of the camera module. If it is determined that the distance between the set reference area and the object of interest satisfies the first designated condition, the processor may adjust up a read-out speed of an image sensor included in the camera module to the second frame rate higher than the first frame rate. For example, the processor may start high-speed capturing. At this time, the second frame rate may mean 960 fps.

In operation 1540, while obtaining the plurality of second image frames, the processor may use at least some second image frames of the plurality of second image frames to identify whether a location of the object of interest belongs at least temporarily to the reference area. For example, the processor may identify movement or the location of the object of interest by using the at least some second image frames of the plurality of second image frames obtained at the second frame rate. The processor may accurately identify the movement or location of the object of interest when using the plurality of second image frames obtained at the second frame rate, rather than using the plurality of first image frames obtained at the first frame rate.

In operation 1550, if the location of the object of interest belongs at least temporarily to the reference area, the processor may generate video which corresponds to the second frame rate for the object of interest by at least using at least some second image frames which correspond to time during which the location of the object of interest belongs at least temporarily to the reference area among the plurality of second image frames. For example, the processor may use the plurality of second image frames to identify a first time point at which the location of the object of interest belongs to the reference area and a second time point at which the location of the object of interest does not belong to the reference area again. The processor may select a plurality of third image frames obtained from the first time point to the second time point from among the plurality of second image frames. The processor may generate video by using at least some third image frames of the selected plurality of third image frames.

A method for controlling an electronic device according to various embodiments comprises obtaining, at a first frame rate, a plurality of first images including an object of interest by using a camera of the electronic device, identifying a distance between the object of interest and a reference area which is set based on an input, by using at least some first images of the plurality of first images, based on the distance satisfying a first designated condition, obtaining, at a second frame rate higher than the first frame rate, a plurality of second images including the object of interest by using the camera, while obtaining the plurality of second images, identifying whether a location of the object of interest at least temporarily belongs to the reference area, by using at least some second images of the plurality of second images, and based on the location at least temporarily belonging to the reference area, generating video which corresponds to the second frame rate for the object of interest by at least using the at least some second images which correspond to time during which the location of the object of interest belongs at least temporarily to the reference area among the plurality of second images.

In a method for controlling an electronic device according to various embodiments, the method may comprise, based on the location not belonging to the reference area, generating video which corresponds to the first frame rate for the object of interest by using at least some of the plurality of first images and the plurality of second images.

In a method for controlling an electronic device according to various embodiments, the method may comprise, as a part of obtaining the plurality of first images, obtaining some of a plurality of lines which compose the plurality of first images as the at least some first images of the plurality of first images, and identifying the distance between the reference area and the object of interest by using the some of the plurality of lines.

In a method for controlling an electronic device according to various embodiments, the method may comprise storing the obtained some of the plurality of lines in a buffer memory, and decompressing the some of the plurality of lines stored in the buffer memory.

In a method for controlling an electronic device according to various embodiments, the method may comprise determining the at least some second images used for generating the video based on a speed at which the object of interest moves.

In a method for controlling an electronic device according to various embodiments, the method may comprise dividing the at least some second images which correspond to time during which the location of the object of interest belongs at least temporarily to the reference area into groups with a designated size in their obtained order and storing the groups in the buffer memory.

In a method for controlling an electronic device according to various embodiments, the method may comprise releasing the set reference area based on a second input which corresponds to the input.

In a method for controlling an electronic device according to various embodiments, the method may further comprise setting a second reference area which corresponds to a second input based on the second input.

In a method for controlling an electronic device according to various embodiments, the method may comprise adjusting the distance according to the first designated condition based on a moving direction and a moving speed of the object of interest, and after the distance is determined to satisfy the first designated condition, based on the location not being determined to belong to the reference area within designated time, adjusting the second frame rate to the first frame rate.

A record medium readable in a computer recording a program for executing a method for controlling an electronic device according to various embodiments, and the method may comprise obtaining, at a first frame rate, a plurality of first images including an object of interest by using a camera of the electronic device, identifying a distance between the object of interest and a reference area which is set based on an input, by using at least some first images of the plurality of first images, based on the distance satisfying a first designated condition, obtaining, at a second frame rate higher than the first frame rate, a plurality of second images including the object of interest by using the camera, while obtaining the plurality of second images, identifying whether a location of the object of interest at least temporarily belongs to the reference area, by using at least some second images of the plurality of second images, and based on the location at least temporarily belonging to the reference area, generating video which corresponds to the second frame rate for the object of interest by at least using the at least some second images which correspond to time during which the location of the object of interest belongs at least temporarily to the reference area among the plurality of second images.

The invention claimed is:
1. An electronic device comprising:
a camera;
a display;
a memory; and
a processor,
wherein the processor is configured to:
obtain, at a first frame rate, a plurality of first images including an object of interest by using the camera;
identify a distance between the object of interest and a reference area which is set based on an input, by using at least some first images of the plurality of first images;
based on the distance satisfying a first designated condition, obtain, at a second frame rate higher than the first frame rate, a plurality of second images including the object of interest by using the camera;
while obtaining the plurality of second images, identify whether a location of the object of interest at least temporarily belongs to the reference area, by using at least some second images of the plurality of second images; and
based on the location at least temporarily belonging to the reference area, generate video which corresponds to the second frame rate for the object of interest by at least using the at least some second images which correspond to time during which the location of the object of interest belongs at least temporarily to the reference area among the plurality of second images.

2. The electronic device of claim 1, wherein the processor is further configured to:
based on the location not belonging to the reference area, generate video which corresponds to the first frame rate for the object of interest by using at least some of the plurality of first images and the plurality of second images.

3. The electronic device of claim 1, wherein the processor is further configured to:
as a part of obtaining the plurality of first images, obtain some of a plurality of lines which compose the first plurality of images as the at least some first images of the plurality of first images; and
identify the distance between the reference area and the object of interest by using the some of the plurality of lines.

4. The electronic device of claim 3, wherein the processor is further configured to:
store the obtained some of the plurality of lines in a buffer memory; and
decompress the some of the plurality of lines stored in the buffer memory.

5. The electronic device of claim 1, wherein the processor is further configured to:
determine the at least some second images used for generating the video based on a speed at which the object of interest moves.

6. The electronic device of claim 1, wherein the processor is further configured to:
divide the at least some second images which correspond to time during which the location of the object of interest belongs at least temporarily to the reference area into groups with a designated size in their obtained order and store the at least some second images divided into the groups in the buffer memory.

7. The electronic device of claim 1, wherein the processor is further configured to:
release the set reference area based on second input which corresponds to the input.

8. The electronic device of claim 1, wherein the processor is further configured to:
set a second reference area which corresponds to a second input based on the second input.

9. The electronic device of claim 1, wherein the processor is further configured to:
adjust the distance according to the first designated condition based on a moving direction and a moving speed of the object of interest.

10. The electronic device of claim 1, wherein the processor is further configured to:
after the distance is determined to satisfy the first designated condition, based on the location not being determined to belong to the reference area within designated time, adjust the second frame rate to the first frame rate.

11. A method for controlling an electronic device, the method comprising:
obtaining, at a first frame rate, a plurality first images including an object of interest by using a camera of the electronic device;
identifying a distance between the object of interest and a reference area which is set based on an input, by using at least some first images of the plurality of first images;
based on the distance satisfying a first designated condition, obtaining, at a second frame rate higher than the first frame rate, a plurality of second images including the object of interest by using the camera;
while obtaining the plurality of second images, identifying whether a location of the object of interest at least temporarily belongs to the reference area, by using at least some second images of the plurality of second images; and
based on the location at least temporarily belonging to the reference area, generating video which corresponds to the second frame rate for the object of interest by at least using the at least some second images which correspond to time during which the location of the object of interest belongs at least temporarily to the reference area among the plurality of second images.

12. The method of claim 11, further comprising:
based on the location not belonging to the reference area, generating video which corresponds to the first frame rate for the object of interest by using at least some of the plurality of first images and the plurality of second images.

13. The method of claim 11, further comprising:
as a part of obtaining the plurality of first images, obtaining some of a plurality of lines which compose the plurality of first images as the at least some of the plurality of first images; and
identifying the distance between the reference area and the object of interest by using the some of the plurality of lines.

14. The method of claim 11, further comprising:
determining the at least some second images used for generating the video based on a speed at which the object of interest moves.

15. The method of claim 11, further comprising:
dividing the at least some second images which correspond to time during which the location of the object of interest belongs at least temporarily to the reference area into groups with a designated size in their obtained order and storing the groups in the buffer memory.

* * * * *